(12) United States Patent
Allavarpu et al.

(10) Patent No.: US 7,010,586 B1
(45) Date of Patent: Mar. 7, 2006

(54) SYSTEM AND METHOD FOR EVENT SUBSCRIPTIONS FOR CORBA GATEWAY

(75) Inventors: Sai V. Allavarpu, Pleasanton, CA (US); Shivaram Bhat, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/552,984

(22) Filed: Apr. 21, 2000

(51) Int. Cl.
  *G06F 15/16* (2006.01)
(52) U.S. Cl. .................. 709/223; 709/224; 709/228; 370/254; 710/20
(58) Field of Classification Search ............... 709/206, 709/220, 223, 224, 226, 227, 228, 230, 203, 709/245; 705/44; 710/20, 39, 52; 370/254
See application file for complete search history.

(56) References Cited

U.S. PATENT DOCUMENTS

| | | | |
|---|---|---|---|
| 5,406,557 A | | 4/1995 | Baudoin |
| 5,452,459 A | | 9/1995 | Drury et al. |
| 5,511,122 A | | 4/1996 | Atkinson |
| 5,586,260 A | | 12/1996 | Hu |
| 5,632,032 A | | 5/1997 | Ault et al. |
| 5,647,002 A | | 7/1997 | Brunson |
| 5,708,780 A | * | 1/1998 | Levergood et al. ......... 709/226 |
| 5,732,270 A | | 3/1998 | Foody et al. |
| 5,848,243 A | | 12/1998 | Kulkarni et al. |
| 5,870,749 A | | 2/1999 | Adusumilli |
| 5,892,950 A | | 4/1999 | Rigori et al. |
| 5,941,978 A | | 8/1999 | Finni |
| 5,953,530 A | | 9/1999 | Rishi et al. |
| 5,974,438 A | | 10/1999 | Neufeld |
| 5,983,233 A | | 11/1999 | Potonniee |
| 5,987,440 A | * | 11/1999 | O'Neil et al. ............... 705/44 |
| 6,018,743 A | | 1/2000 | Xu |

(Continued)

OTHER PUBLICATIONS

"What is CORBA?," Object Management Group, Inc., 1997-1999, 2 pages.

(Continued)

*Primary Examiner*—Khanh Dinh
(74) *Attorney, Agent, or Firm*—Robert C. Kowert; Meyertons, Hood, Kivlin, Kowert & Goetzel, P.C.

(57) ABSTRACT

A CORBA Gateway between CORBA-based applications and an enterprise manager may be configurable to manage various networked objects, such as printers, scanners, copiers, telephone systems, cell phones, phone systems, faxes, routers, switches, etc., which may be interconnected via networks. Various embodiments of the CORBA Gateway may include an Event Gateway which manages object events. The CORBA Event Gateway is designed to leverage existing Event Distribution Server (EDS) sinks to provide EDS filtering functionality and EDS object level access control functionality. The approach leverages existing EDS solutions by providing a common sink for all events/notifications and using a unique Event Port Registry to manage the subscriptions of various TMN clients that subscribe for such events/notifications. Generally, the approach described provides the capability to filter events according to criteria presented by client event subscriptions. In one embodiment, the events may be filtered to enforce policy-based access control on TMN events/notifications, determining which CORBA client applications have access to which events. The filtering of events at the sink based upon client subscriptions decreases unnecessary network traffic in that events may be "pushed" to the client, rather than delivered upon client request. In addition, the approach may provide easy-to-use IDL APIs that allow CORBA clients to directly subscribe/unsubscribe to events based on criteria such as object class, object instance, and event type.

39 Claims, 16 Drawing Sheets

U.S. PATENT DOCUMENTS

| | | | |
|---|---|---|---|
| 6,023,579 | A | 2/2000 | Hellgren et al. |
| 6,042,614 | A | 3/2000 | Davidson et al. |
| 6,085,240 | A | 7/2000 | Suzuki et al. |
| 6,176,883 | B1 | 1/2001 | Holloway et al. |
| 6,202,199 | B1 | 3/2001 | Wygodny et al. |
| 6,205,482 | B1 | 3/2001 | Navarre et al. |
| 6,208,345 | B1 | 3/2001 | Sheard et al. |
| 6,209,018 | B1 | 3/2001 | BenShachar et al. |
| 6,247,039 | B1 | 6/2001 | Callsen |
| 6,279,029 | B1 * | 8/2001 | Sampat et al. ............... 709/203 |
| 6,282,579 | B1 | 8/2001 | Carre |
| 6,282,701 | B1 | 8/2001 | Wygodny et al. |
| 6,289,393 | B1 | 9/2001 | Phillips et al. |
| 6,298,378 | B1 * | 10/2001 | Angal et al. ................ 709/223 |
| 6,317,428 | B1 | 11/2001 | Mercouroff et al. |
| 6,321,337 | B1 | 11/2001 | Reshef et al. |
| 6,324,648 | B1 | 11/2001 | Grantges, Jr. |
| 6,330,598 | B1 | 12/2001 | Beckwith et al. |
| 6,343,332 | B1 | 1/2002 | Ueda |
| 6,356,930 | B1 | 3/2002 | Garg |
| 6,363,421 | B1 * | 3/2002 | Barker et al. ............... 709/223 |
| 6,378,124 | B1 | 4/2002 | Bates et al. |
| 6,378,125 | B1 | 4/2002 | Bates et al. |
| 6,445,776 | B1 | 9/2002 | Shank et al. |
| 6,466,971 | B1 * | 10/2002 | Humpleman et al. ....... 709/220 |
| 6,467,052 | B1 | 10/2002 | Kaler et al. |
| 6,496,833 | B1 | 12/2002 | Goldberg et al. |
| 6,530,079 | B1 | 3/2003 | Choi et al. |
| 6,539,501 | B1 | 3/2003 | Edwards |
| 6,546,419 | B1 * | 4/2003 | Humpleman et al. ....... 709/223 |
| 6,694,368 | B1 * | 2/2004 | An et al. .................... 709/227 |
| 6,839,748 | B1 * | 1/2005 | Allavarpu et al. .......... 709/223 |

OTHER PUBLICATIONS

"CORBA Overview," Object Management Group, Inc., 1995, 13 pages.

"Overview of CORBA," Object Management Group, Inc., Jan. 19, 2000, 4 pages.

"Java, RMI and CORBA," Object Management Group, Inc., 1997-1999, 8 pages.

"A CORBA Primer," Technical Overview, A White Paper, Segue Software, 7 pages.

"Development Environment," Sun Microsystems, Inc., 1994-2000, 11 pages.

"Solstice Enterprise Manager 2.1 Reviewr's/Evaluator's Guide for Telecommunications Network Management," Sun Microsystems, Inc., 1998, pp. 1-45.

"Solstice Enterprise Manager 2.1: A Technical White Paper, ", Sun Microsystems, Inc. Chapters 1-6, 68 pages, 1997.

"Solstive Enterprise Manager 3.0: Satisfying the Needs of Telecom Carriers & Services Providers," Sun Microsystems, Inc., 1994-2000, 3 pages.

"Joint Inter Domain Management (JIDM)," The Open Group, Jan. 10, 2000, 5 pages.

"Specification of Abstract Syntax Notation One (ASN.1)," International Telecommunication Union, ITU-T Recommendation X.208, 1988 and 1993, pp. 1-72.

"Specification of Basic Encoding Rules for Abstract Syntax Notation One (ASN.1)," International Telecommunication Union, ITU-T Recommendation X.209, 1988 and 1993, pp. 1-23.

" Inter-Domain Management: Specification Translation,", The Open Group, 1997, 281 pages.

"CORBA-Based Telecommunication Network Management Systems," Object Management Group, Inc., May 1996, pp. 1-29.

"Intelligent Networking with CORBA, *A White Paper,*" Nortel, et al., Draft 2.0, Oct. 31, 1996, pp. 1-7.

"Inter-Domain Management Between CORBA and SNMP: WEB-Based Management-CORBA/SNMP Gateway Approach," Subrata Mazumdar, Lucent Technologies, 1996, pp. 1-16.

"Mapping of Common Management Information Services to CORBA Objects Services Specification," Subrata Mazumdar, Lucent Technologies, Mar. 10, 1997, pp. 1-68.

"A Discussion of the Object Management Architecture," Object Management Group, Inc., Jan. 1997, pp. 1-1 to 1-6, 2-1 to 2-6, 3-1 to 3-8, 4-1 to 4-12, A-1 to A-8.

"CMIS/C++: Application Programming Interface," Network Management Forum, Issue 1.0, Feb. 1998, pp. 1-226.

"JIDM Interaction Translation," Final Submission to OMG's CORBA/TMN Interworking RFP, Object Management Group, Inc. Edition 4.3, OMG Document No.: telecom/98-10-10, Oct. 1998, 273 pages.

Guy Genilloud, "An Analysis of the OSI Systems Management Architecture from an ODP Perspective," IEEE, 1996, pp. 72-81.

N. Lynch, et al., "Web Enabled TMN Manager," Telecommunications, Conference Publication No. 451, Apr. 1, 1998, pp. 121-126.

* cited by examiner

SYSTEM AND METHOD FOR EVENT SUBSCRIPTIONS FOR CORBA GATEWAY

BACKGROUND OF THE INVENTION

1. Field of the Invention

The present invention relates generally to computer software. More particularly, the present invention relates to network management software.

2. Description of the Relevant Art

The field of network management involves the management of networked devices, often remotely. A computer network is a linked group of two or more computers. Generally, networks may be classified as Local-Area Networks (LANs) or Wide-Area Networks (WANs). In a LAN, the computers or devices are typically connected together within a "local" area such as a home, office, or group of offices. In a WAN, the computers or devices are typically separated by a greater distance and are often connected via telephone/communication lines, radio waves, or other suitable means of connection.

Networks are usually classified using three properties: topology, protocol, and architecture. Topology specifies the geometric arrangement of the network. Common topologies are bus, ring, and star configurations. A network's protocol specifies a common set of rules and/or signals, such as Ethernet or Token Ring, which the networked devices use to communicate with each other. A network's architecture typically specifies one of the two major types of network architecture: peer-to-peer or client/server. In a peer-to-peer networking configuration, there is no server, and computers simply connect with each other in a workgroup to share files, printers, services, and Internet access. Client/server networks often include a domain controller to which all of the networked computers log on. This server may provide various services such as centrally routed Internet access, e-mail, file sharing, printer access, and security services.

Many types of devices may be managed over a network, such as printers, scanners, phone systems, copiers, and many other devices and appliances configured for network operation. Typically, such devices are managed via requests and events. A request is a message sent to a managed object. A request may be sent by a manager application to a managed object to query the object about a particular parameter associated with the object. A request may also be sent to a managed object to modify a parameter of the object. Alternately, an event is a message originating with a managed object. Events may be sent by managed objects to signal some change of state of the managed object, or to communicate information about the managed object. Managing such devices tends to require that the data types of each device's control parameters and signals be well defined. For example, a networked printer might have a Boolean status parameter which indicates whether the device is currently on or off and a control parameter which turns the printer on or off. A manager application may send a request to determine the on/off status of the printer. Then, once the status is determined, say, to be off, a subsequent request may be sent to modify the control parameter to turn the printer on. The printer may also be capable of generating an alert signal indicating, for example, that the toner level is low. In this case, an event communicating that fact may be sent by the managed object (the printer) to the appropriate manager application.

The network management software should be able to read and write these data correctly in order to manage the device. To do this, information about the data is required. Such information is referred to as metadata, or "data about data." Metadata may typically describe what type of data (string, integer, Boolean, structure) an object has and how the data are formatted. Metadata is essential for understanding information related to managed devices, as well as information stored in data warehouses. Typically, network management software manages a given device by storing and manipulating a representation of its pertinent data as a software object, herein referred to as a "managed object." This object is the virtual representation of the device on the network.

FIG. 1a illustrates an example of typical elements of a telecommunications network. The telecommunications world is characterized by devices such as cell phones, cell phone towers and other kinds of towers 156, phone systems 151, faxes 152, routers 153, switches 154, satellite dishes 155, etc., which may be interconnected via networks 108a. The management of such a large number of devices results in a huge volume of event/request traffic, which must itself be managed. In response to the network management needs of this technology sector, a conceptual framework for telecom network management called TeleManagement Network (TMN) was developed by the Telecom Management Forum (TMF). TMN defines the relationship between basic network building blocks, such as network elements, different network protocols, and operations systems, in terms of standard interfaces. Generally, a TMN system includes Agent hardware 150, Manager software 170, and Agent software 160. The Agent hardware 150 includes the managed devices such as those shown in FIG. 1a. The Manager software 170 includes any application used to manage a networked device. These manager applications, or client applications, may be installed and executed on one or more client computer systems 171a, 171b, . . . , 171n. The Agent software 160 includes the software interface between the Manager software 170 (for communications via network 108b) and the Agent hardware 150 (for communications via network 108a). The Agent software 160 may be installed and executed on one or more server computer systems 161a, 161b, . . . , 161n. In some instances, the Agent software 160 and Manager software 170 may be installed and executed on the same computer system. The Agent software 160 may also reside, in whole or part, on the Agent hardware 150 itself.

One TMN approach to managing objects over a network is the Simple Network Management Protocol (SNMP), a set of protocols for managing complex networks. SNMP works by sending messages, called protocol data units (PDUs), to different parts of a network. SNMP-compliant devices, called agents, store data about themselves in Management Information Bases (MIBs) and return this data to the SNMP requesters. The metadata used by SNMP to describe managed object data variables includes the variable title, the data type of the variable (e.g. integer, string), whether the variable is read-only or read-write, and the value of the variable. SNMP works over the TCP/IP (Transport Control Protocol/Internet Protocol) communication stack. SNMP also uses UDP over IP, and also may support TCP over IP. It is widely held, however, that SNMP was developed as a simple "quick fix" and was never intended to be a permanent solution to network management. Consequently, one problem with SNMP is that the information it specifies is neither detailed nor well-organized enough to adequately serve the expanding needs of modern networking.

Another example of a TMN network management protocol is the Common Management Information Protocol (CMIP). In the U.S. the CMIP protocol is primarily run over TCP/IP, while in Europe it is generally run over the OSI (Open Systems Interconnection) communication stack and was designed to replace SNMP and address SNMP's shortcomings by providing a larger, more detailed network manager. Its basic design is similar to SNMP: Management requests, management responses, and notifications are employed to monitor a network. These correspond to SNMP's PDUs. CMIP, however, contains eleven types of messages, compared to SNMP's five types of PDUs.

In CMIP, variables are seen as complex and sophisticated data structures with many attributes. These include: variable attributes, which represent the variable's characteristics (e.g., its data type, whether it is writable); variable behaviors, or the actions of that variable that can be triggered; and notifications, or event reports generated by the variable whenever a specified event occurs (e.g., a terminal shutdown would cause a variable notification event).

As a comparison, SNMP only employs variable attributes and notifications, but not variable behaviors. One of the strongest features of the CMIP protocol is that its variables not only relay information to and from the terminal (as in SNMP), but they can also be used to perform tasks that would be impossible under SNMP. For instance, if a terminal on a network cannot reach its fileserver for a predetermined number of tries, then CMIP can notify the appropriate personnel of the event. With SNMP, a user would need to explicitly keep track of the number of unsuccessful attempts to reach the fileserver. CMIP thus results in a more efficient network management system, as less work is required by a user to keep updated on the status of the network.

A significant disadvantage of the CMIP protocol is that it requires more system resources than SNMP, often by a factor of ten. Thus, any move to CMIP from SNMP requires a dramatic upgrade in network resources. Another disadvantage with CMIP is that it is very difficult to program; the variable metadata includes so many different components that few programmers are generally able to use the variables to their full potential.

Both of the above protocols have been implemented in a number of programming languages, such as C, C++, and Java™. However, network management software which takes advantage of SNMP or CMIP must be written specifically for the language of the protocol implementation. In other words, SNMP-based and CMIP-based network management software is dependent upon a particular programming language and protocol implementation.

GDMO (Guidelines for Definition of Managed Objects) is a standard for defining objects in a network in a consistent way. With a consistent "language" for describing such objects as workstations, LAN servers, and switches, programs can be written to control or sense the status of network elements throughout a network. GDMO prescribes how a network product manufacturer must describe the product formally so that others can write programs that recognize and deal with the product. Using GDMO with ASN1, descriptions may be made of the class or classes of the object, how the object behaves, its attributes, and classes that it may inherit.

GDMO is part of the CMIP and also the guideline for defining network objects under TMN. The object definitions created using GDMO and related tools form a Management Information Base (MIB). GDMO uses Abstract Syntax Notation One (ASN1) as the rules for syntax and attribute encoding when defining the objects. Abstract Syntax Notation One is a language that defines the way data is sent across dissimilar communication systems. ASN1 ensures that the data received is the same as the data transmitted by providing a common syntax for specifying application layer (e.g., program-to-program communications) protocols. Each communications system contains a similar ASN1 encoding/decoding scheme written in the language used on that particular system. When one system wants to send data to another, the first system encodes the data into ASN1, sends the data, and the second system receives and decodes the data using the decoder written in the language used on that system.

In response to the difficulties presented by SNMP and CMIP, the Object Management Group (OMG) and Joint Inter-Domain Management (JIDM) have defined Interface Definition Language (IDL) for network management, which is used to access object instance data and may be used across a plurality of programming languages and across a plurality of platforms. JIDM IDL allows programmers to write only one set of interfaces for a particular object across multiple programming languages, rather than having to write a new set of interfaces for each programming language.

A middleware standard used extensively in network management is the Common Object Request Broker Architecture (CORBA), which is provided by the Object Management Group (OMG). CORBA specifies a system that provides interoperability between objects in a heterogeneous, distributed environment and in a way transparent to the programmer. Its design is based on the OMG Object Model, which defines common object semantics for specifying the externally visible characteristics of objects in a standard and implementation-independent way. In this model, clients request services from objects (which will also be called servers) through a well-defined interface. This interface is specified in the OMG Interface Definition Language (IDL).

In CORBA, a client accesses an object by issuing a request to the object. The request is an event, and it carries information including an operation, the object reference of the service provider, and actual parameters, if any. The object reference is an object name that reliably defines an object.

A central component of CORBA is the Object Request Broker (ORB). The ORB encompasses the communication infrastructure necessary to identify and locate objects, handle connection management, and deliver data. In general, the ORB is not required to be a single component; it is simply defined by its interfaces. The basic functionality provided by the ORB includes passing the requests from clients to the object implementations on which they are invoked. The ORB acts as the middleware between clients and servers. In the CORBA model, a client can request a service without knowing anything about what servers are attached to the network. The various ORBs receive the requests, forward them to the appropriate servers, and then hand the results back to the client.

In CORBA, a client first looks up the object (server) it wants to communicate with. The ORB, as a result of the lookup operation, returns an object reference (a handle) of the server to the client. The client then uses the object reference to invoke operations on the object as a function call in the chosen programming language. The ORB intercepts the client request, collects the information about the operation and the request parameter values, encodes it in IIOP, and sends it to the object (server). The ORB on the object side (server) translates the request into a programming language specific function call on the server object. The server object then processes the request and returns a response, if any. The ORB intercepts the response, encodes the response and its parameters into IIOP, and sends it to the client. The ORB on the client side then returns the response to the client as the return value of the function call originally made as part of issuing the request.

In many cases, CORBA gateways to specific services may be developed to manage specific network traffic, such as requests and events. Typically, these gateways are designed as single-threaded programs. However, increasingly, the benefits of multi-threading are desired for applications and server programs related to network management.

Multi-Threaded Applications

A thread is an encapsulation of the flow of control in a program. Most programs are single-threaded; they only execute one path through their code at a time. Multi-threaded programs may have several threads running through different code paths simultaneously. Multi-threading typically means sharing a single CPU between multiple threads in a way designed to minimize the time required to switch threads. This is accomplished by sharing as much as possible of the program execution environment between the different threads so that very little state needs to be saved and restored when changing threads. Furthermore, if a computer has multiple CPUs and a program has multiple threads, multiple threads of the program may be run on separate CPUs concurrently. Thus multi-threading allows applications to scale with the number of CPUs, as well.

Multi-threading differs from multi-tasking in that threads share more of their environment with each other than do tasks under multi-tasking. Threads may be distinguished only by the value of their program counters and stack pointers while sharing a single address space and set of global variables. Often, there is very little protection of one thread from another, in contrast to multi-tasking. Multi-threading can thus be used for very fine-grained multi-tasking at the level of a few instructions and therefore can hide latency by keeping the processor busy after one thread issues a long-latency instruction on which subsequent instructions in that thread depend.

In a typical process in which multiple threads are used, zero or more threads may actually be running at any one time. This depends on the number of CPUs used by the computer on which the process is running, and also on how the threads system is implemented. A machine with n CPUs may run no more than n threads in parallel, but it may give the appearance of running many more than n threads simultaneously by sharing the CPUs among threads.

A context switch between two threads in a single process is considerably more efficient than a context switch between two processes. In addition, the fact that all data except for stack and registers are shared between threads makes them a natural vehicle for expressing tasks that may be broken down into subtasks that may be run cooperatively. Global variables and resources are shared between threads within the same process. Each thread has its own stack.

In many ways, the use of threads provides benefits over the use of processes in that threads are more efficient to create, switching between threads in the same process is much more efficient than switching processes, and there is easier sharing of resources between threads. Context switching among threads is very efficient in that there are no page or segment table manipulations, no flushing of the associative memory cache (when switching among threads sharing an address space), and no copying of data when exchanging messages among threads of the same address space.

As used herein, "thread-safe" refers to the property that a program may safely use or be used by multiple threads to avoid, for example, data inconsistencies, access collisions, coherency problems, and other errors. When multiple threads share resources, access to the resources should be synchronized to ensure thread-safety. One way this may be accomplished is through the use of a mutual exclusion (mutex) object. A mutual exclusion object allows multiple threads to synchronize access to shared resources. A mutex has two states: locked and unlocked. Once a mutex has been locked by a thread, other threads attempting to lock it will be blocked. When the locking thread unlocks (releases) the mutex, one of the blocked threads may acquire (lock) it and proceed. When managed object events and responses are delivered to a client manager application using multiple threads, synchronization and serialization of the event and response deliveries may become problematic in that the use of different threads to deliver sequential events may introduce chronological inconsistencies due to differing thread execution times. In other words, if a first event is sent using a first thread, and a subsequent second event is sent using a second thread, then depending upon the execution times of the two threads, the second event may actually be delivered prior to the first event.

The existing standards for TMN event management do not address the issue of Access control to TMN events in a platform-independent interface. Currently, that is, mechanisms do not exist to readily manage which TMN manager applications have access to particular managed object events. In addition, clients are required to receive events only indirectly, by creating Common Management Information Service (CMIS) filters. These shortcomings may result in substantial loss of scalability and performance with regard to TMN object event management. Furthermore, the issues of client authentication, object-level access control, and security/audit trails for TMN system usage are not addressed by existing standards. Finally, the existing standards do not allow the clients the option to choose the format in which to receive events.

Therefore, improved systems and methods for managing objects over a network are desired.

SUMMARY OF THE INVENTION

The problems outlined above are in large part solved by various embodiments of a system and method for managing object events over a network. A CORBA Gateway between CORBA-based applications and an enterprise manager may be configurable to manage various networked objects, such as printers, scanners, copiers, telephone systems, cell phones, cell phone towers, phone systems, faxes, routers, switches, etc., which may be interconnected via networks. CORBA-based TMN manager applications may be communicatively coupled to a CORBA Object Request Broker (ORB). The manager applications may be operable to send Interface Definition Language (IDL) requests and receive IDL responses and CORBA events through the CORBA ORB. The CORBA Gateway may also be communicatively coupled to the CORBA ORB and be operable to communicate with the CORBA ORB via communications methods such as the Internet Inter-Object Protocol (IIOP), also known as the Internet Inter-ORB Protocol, and IDL. The enterprise manager may be coupled to the CORBA gateway via a proprietary or platform-dependent interface such as Portable Management Interface (PMI) from Sun Microsystems, Inc. The enterprise manager may include a Management Information System (MIS) through which managed objects may be accessed. In one embodiment, the CORBA gateway may translate the enterprise manager PMI events and PMI responses to IDL/IIOP events and responses which may be passed on through the CORBA ORB to the manager applications in the form of IDL responses and CORBA events. Similarly, the CORBA gateway may translate the CORBA manager requests from IDL to PMI requests. Various embodiments of the CORBA Gateway may include one or more components such as an Event Gateway which manages object events and a Request Gateway which manages object requests and responses.

In one embodiment, the CORBA Event Gateway is designed to leverage existing Event Distribution Server (EDS) sinks to provide EDS filtering functionality and EDS object level access control functionality. Therefore, the high-level design philosophy of the Event Gateway is to CORBA-enable EDS sinks. In particular, the approach leverages existing EDS solutions by providing a common sink for all events/notifications and using a unique Event Port Registry to manage the subscriptions of various TMN clients that subscribe for such events/notifications. The approach improves performance and scalability by allowing event sinks to be distributed. Instead of having all clients receive their events from one event sink, the approach allows clients to receive events from different sinks, thereby providing load-balancing. In one embodiment, multiple instances of CORBA-enabled EDS sinks may be running in a single system, thereby allowing different CORBA clients to receive events from different CORBA-enabled EDS sinks. However, CORBA clients are not aware of this multitude of CORBA-enabled EDS sinks because this feature is transparent to the clients.

Generally, the approach described provides the capability to filter events according to criteria presented by client event subscriptions. In one embodiment, the events may be filtered to enforce policy-based access control on TMN events/notifications, determining which CORBA client applications have access to which events. The filtering of events at the sink based upon client subscriptions decreases unnecessary network traffic in that events may be "pushed" to the client, rather than delivered upon client request. This is a substantial improvement over standard polling approaches. In addition, the approach may provide easy-to-use IDL APIs that allow CORBA clients to directly subscribe/unsubscribe to events based on criteria such as object class, object instance, and event type. For example, a print manager application may subscribe to all events relating to the toner supply of laser printers of a particular make and model. The use of IDL may provide a platform-independent interface to deliver events generated by one or more managed objects to manager applications through the Event Gateway. Event subscriptions may be managed with services provided by an event port registry server.

An EventPortRegistry Server, an Event Distribution System (EDS), a Management Information System (MIS), a Request Gateway, and one or more TMN Manager Applications may be communicatively coupled to one another as appropriate, via Internet Inter-Object Protocol (IIOP). The MIS provides an interface through which requests and events may be communicated with managed objects on the network. Events originating with a managed object may be passed by the MIS to the EDS Source, which routes the message to an EDS Sink, where event filtering may occur in accordance with client subscription specifications. The EDS Sink may then determine which clients are to receive the event and route the event to the appropriate ports, which correspond to the subscribing clients. In this manner, events may be filtered at the sink level rather than on the client side, which greatly reduces network traffic.

In one embodiment, an Event Distribution Server (EDS) which is coupled to the event port registry server is configurable to listen for events generated by the one or more managed objects and to deliver the events to the one or more managers, depending upon the managers' event subscriptions and event access control. The EDS may include an EDS Source and one or more EDS Sinks. In one embodiment, a CORBA client may listen for events by creating and registering EventPorts and creating an Event Forwarding Discriminator (EFD). When the create request is processed by the CORBA Request Gateway and sent to the MIS, the EFD may process this create request and send the AE-Title as a listener to one of the EDS Sinks. The EDS code will preferably take care of this automatically.

When the EDS Sink gets an event, it may retrieve the appropriate EventPort from the EventPortRegistry server and dispatch the event. Note that a CORBA client may be served by any of the EDS sinks, and there may be more than one instance of EDS sink in the enterprise manager. Different CORBA clients may be served by different EDS sinks. In one embodiment, this is all done transparently by the existing EDS code.

A managed object initiates or generates an event. Events may include notifications, warnings, or alarms concerning a status or occurrence relating to the managed object or corresponding device. For example, an event may be generated when a monitored device experiences an error which causes it to suspend operation. Of course, events may also be generated under less critical circumstances. For example, a monitored device may generate a notification if usage of a particular resource reaches a particular threshold, such as a printer running low on toner or a background process exceeding a threshold percentage of CPU usage.

An EDS Source may receive the event through MIS. In one embodiment, the event may be transferred to the EDS Source through PMI or another suitable interface, such as a platform-specific interface. The EDS Source serves to collect all incoming events and route them to Sinks, which may act as filters to restrict the targets to which the events may be sent. The EDS Source sends the event to an EDS Sink. The EDS Sink may find the appropriate manager for the event message. The EDS Sink may query the EventPortRegistry to retrieve the corresponding event port through which to send the event. Access control checks may be performed by comparing the client manager ID with access privilege information. This ensures that the client manager is authorized to receive the event. The EDS Sink may then convert the event (as sent through PMI, for example) into a CORBA event, i.e., an event expressed in IDL. The EDS Sink may then enqueue the event in a queue corresponding to the particular manager. This queue is required to ensure ordered delivery of events to the consumer. In particular, the delivery of events may occur in the order in which the events are generated. The EDS Sink may then dispatch the event to the client.

BRIEF DESCRIPTION OF THE DRAWINGS

Other objects and advantages of the invention will become apparent upon reading the following detailed description and upon reference to the accompanying drawings in which.

Figure 1A:
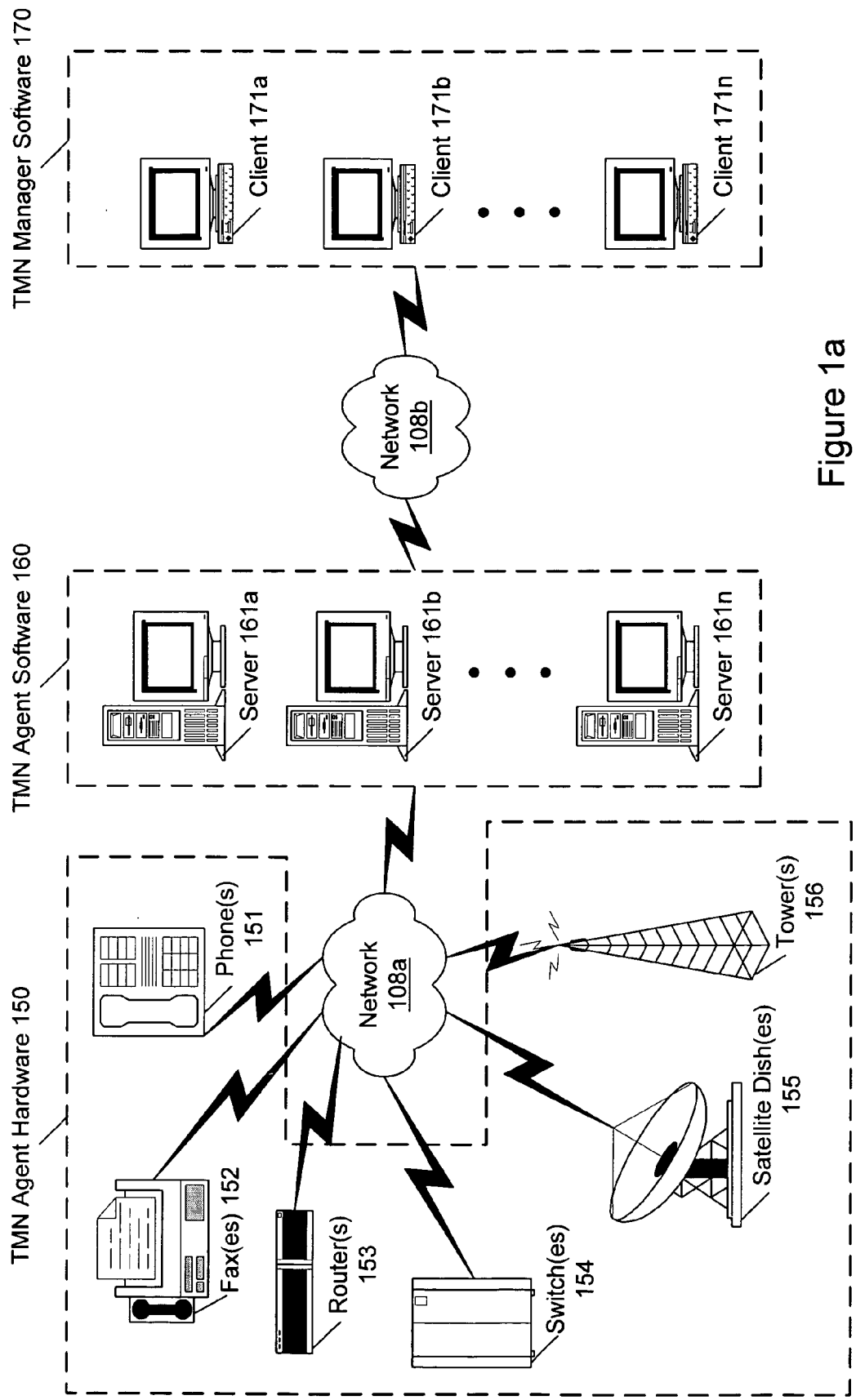
FIG. 1a illustrates an example of typical elements of a telecommunications network.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 1B:
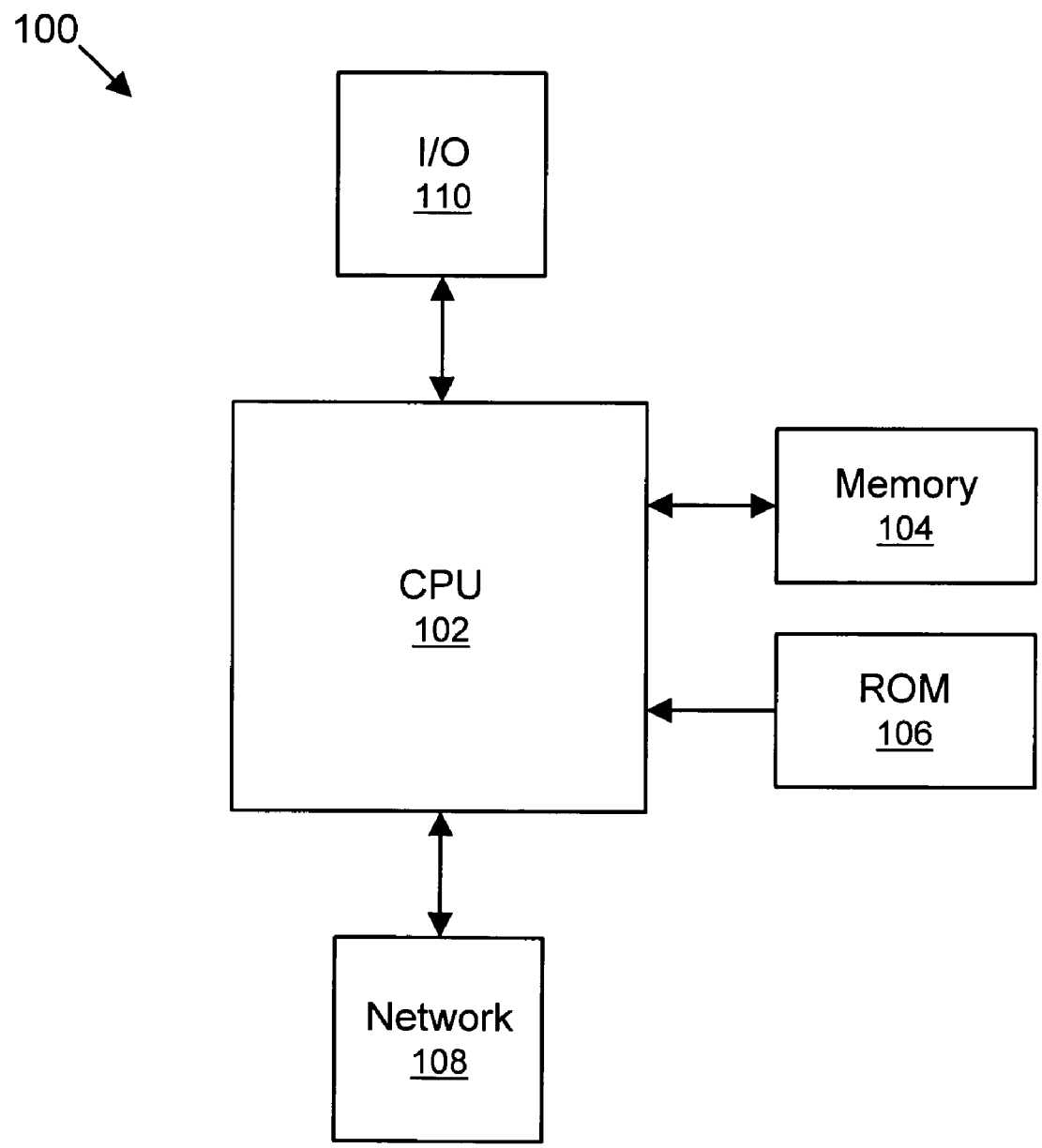
FIG. 1b is an illustration of a typical computer system architecture which is suitable for implementing various embodiments.

FIG. 1b: A Typical Computer System

Turning now to the drawings, FIG. 1b is an illustration of a typical, general-purpose computer system 100 which is suitable for implementing various embodiments of the system and method for network management as disclosed herein. The computer system 100 includes at least one central processing unit (CPU) or processor 102. The CPU 102 is coupled to a memory 104 and a read-only memory (ROM) 106. The memory 104 is representative of various types of possible memory media: for example, hard disk storage, floppy disk storage, removable disk storage, or random access memory (RAM). The terms "memory," "memory medium," and "storage medium" may include an installation medium, e.g., a CD-ROM or floppy disk, a computer system memory such as DRAM, SRAM, EDO RAM, etc., or a non-volatile memory such as a magnetic media, e.g., a hard drive or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1b, typically the memory 104 permits two-way access: it is readable and writable. The ROM 106, on the other hand, is readable but not writable. The memory 104 and/or ROM 106 may store instructions and/or data which implement all or part of the system and method described in detail herein, and the memory 104 and/or ROM 106 may be utilized to install the instructions and/or data. In various embodiments, the computer system 100 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" can be broadly defined to encompass any device having a processor which executes instructions from a memory medium.

The CPU 102 may be coupled to a network 108. The network 108 is representative of various types of possible networks: for example, a local area network (LAN), wide area network (WAN), or the Internet. The system and method for network management as disclosed herein may therefore be implemented on a plurality of heterogeneous or homogeneous networked computer systems 100 through one or more networks 108. The CPU 102 may acquire instructions and/or data for implementing system and method for network management as disclosed herein over the network 108.

Through an input/output bus 110, the CPU 102 may also coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output. The CPU 102 may acquire instructions and/or data for implementing the system and method for network management as disclosed herein through the input/output bus 110.

The computer system 100 is operable to execute one or more computer programs. The computer programs may comprise operating system or other system software, application software, utility software, Java™ applets, and/or any other sequence of instructions. Typically, an operating system performs basic tasks such as recognizing input from the keyboard, sending output to the display screen, keeping track of files and directories on the disk, and controlling peripheral devices such as disk drives and printers. Application software runs on top of the operating system and provides additional functionality. Because applications take advantage of services offered by operating systems, and because operating systems differ in the services they offer and in the way they offer the services, an application must usually be designed to run on a particular operating system. The computer programs are stored in a memory medium or storage medium such as the memory 104 and/or ROM 106, or they may be provided to the CPU 102 through the network 108 or I/O bus 110.

In one embodiment, the computer programs executable by the computer system 100 may be implemented in an object-oriented programming language. In an object-oriented programming language, data and related methods can be grouped together or encapsulated to form an entity known as an object. All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

Figure 2:
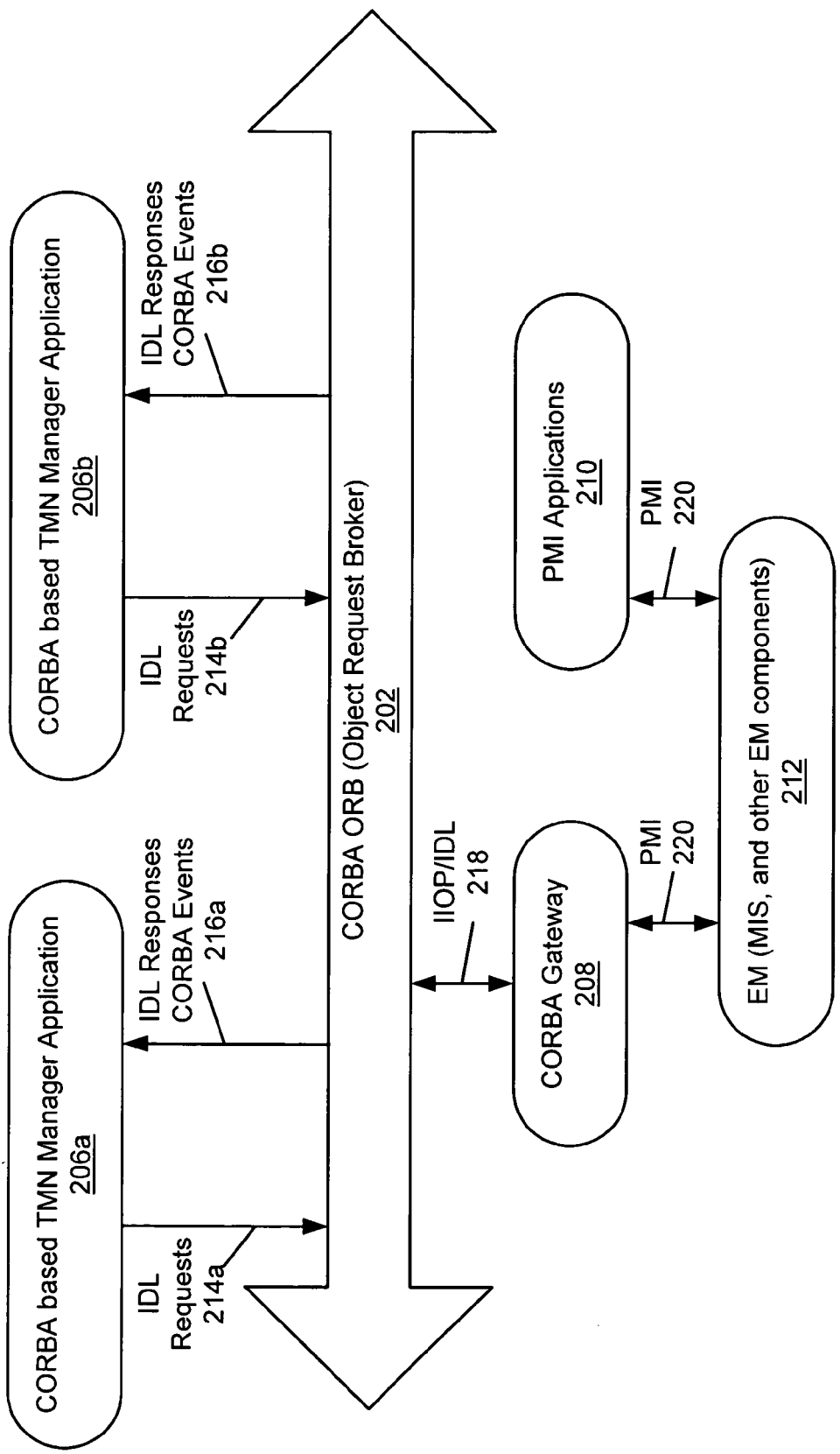
FIG. 2 is an illustration of a CORBA gateway to an enterprise manager according to one embodiment.

FIG. 2: CORBA Gateway

FIG. 2 illustrates a CORBA Gateway between CORBA-based applications and an enterprise manager according to one embodiment. In one embodiment, the CORBA-based system including the CORBA Gateway 208 may be configurable to manage various networked objects, such as printers, scanners, copiers, telephone systems, cell phones, cell phone towers, phone systems, faxes, routers, switches, etc., which may be interconnected via networks. For purposes of simplicity, similar components, e.g., manager applications 206a and 206b, may be referred to collectively herein by a single reference numeral, e.g., 206. As shown in FIG. 2, CORBA-based TMN manager applications 206 may be communicatively coupled to a CORBA Object Request Broker (ORB) 202. The manager applications 206 may be operable to send Interface Definition Language (IDL) requests 214 and receive IDL responses and CORBA events 216 through the CORBA ORB 202. A CORBA Gateway 208 may also be communicatively coupled to the CORBA ORB 202 and be operable to communicate with the CORBA ORB 202 via communications methods 218 such as the Internet Inter-Object Protocol (IIOP), also known as the Internet Inter-ORB Protocol, and IDL. IIOP is a protocol developed by the Object Management Group (OMG) to implement CORBA solutions over the World Wide Web. Unlike HTTP, IIOP enables browsers and servers to exchange integers, arrays, and more complex objects.

In one embodiment, an enterprise manager 212 may be coupled to the CORBA gateway 208 via a proprietary or platform-dependent interface such as Portable Management Interface (PMI) 220 from Sun Microsystems, Inc. The enterprise manager 212 may include various enterprise management components such as a Management Information System (MIS), etc. Also coupled to the enterprise manager 212 via PMI 220 may be one or more PMI applications 210. PMI applications may include, for example, applications which provide access to event notification, subscription, and propagation services and access to object instance information. In one embodiment, the enterprise manager 212 may be Solstice Enterprise Manager (SEM) from Sun Microsystems, Inc., and examples of the one or more PMI applications 210 that use PMI to communicate with the SEM MIS may include SEM Viewer, SEM Alarm Manager, SEM Discovery, etc. In one embodiment, the CORBA gateway 208 may translate the CORBA manager requests 214 from IDL to PMI requests 220. Similarly, the CORBA gateway 208 may translate the enterprise manager PMI responses and PMI events 220 to IDL/IIOP responses and events 218 which may be passed on through the CORBA ORB 202 to the manager applications 206 in the form of IDL responses and CORBA events 216.

Figure 3:
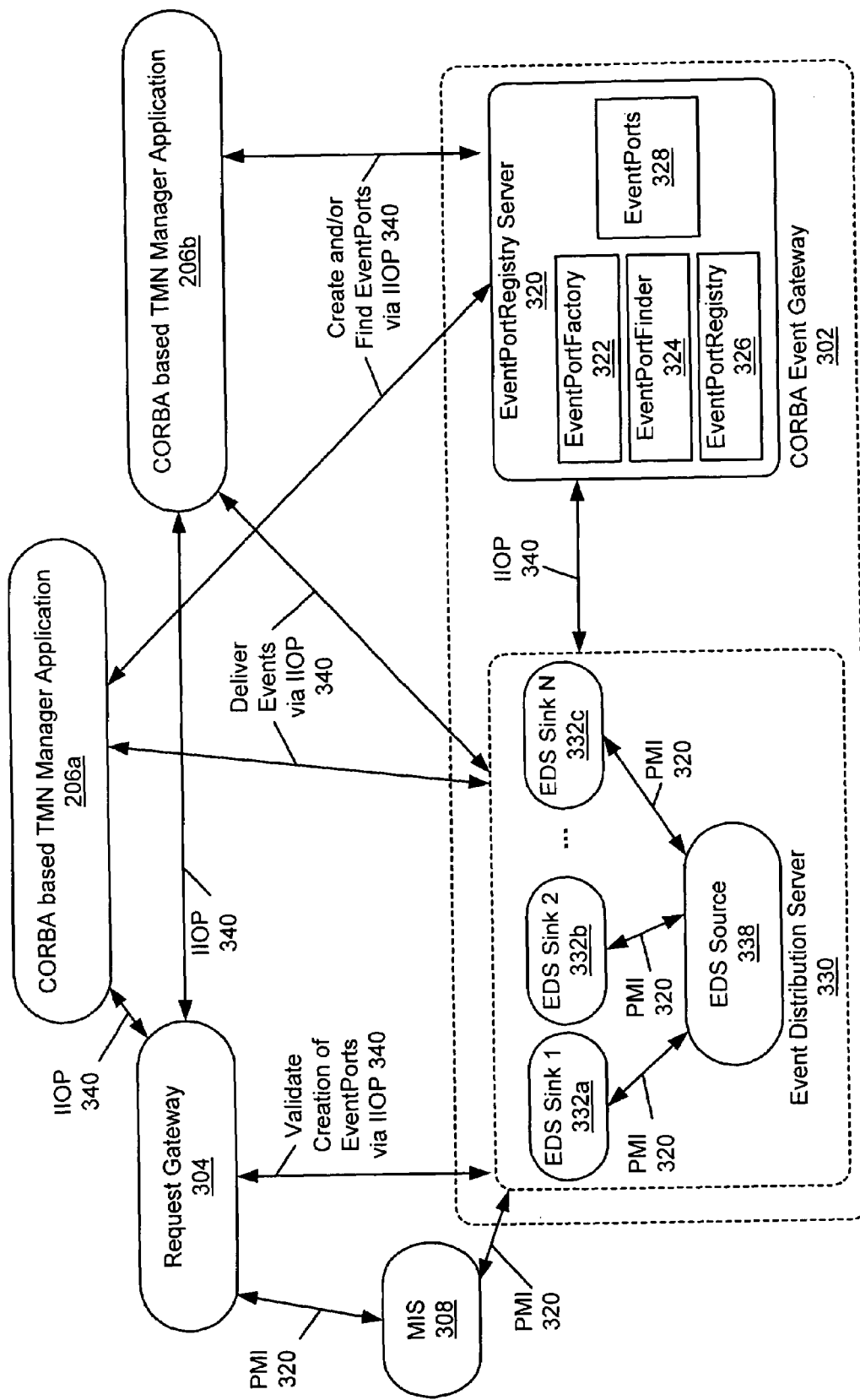
FIG. 3 is an illustration of a CORBA event gateway according to one embodiment.
Figure 7:
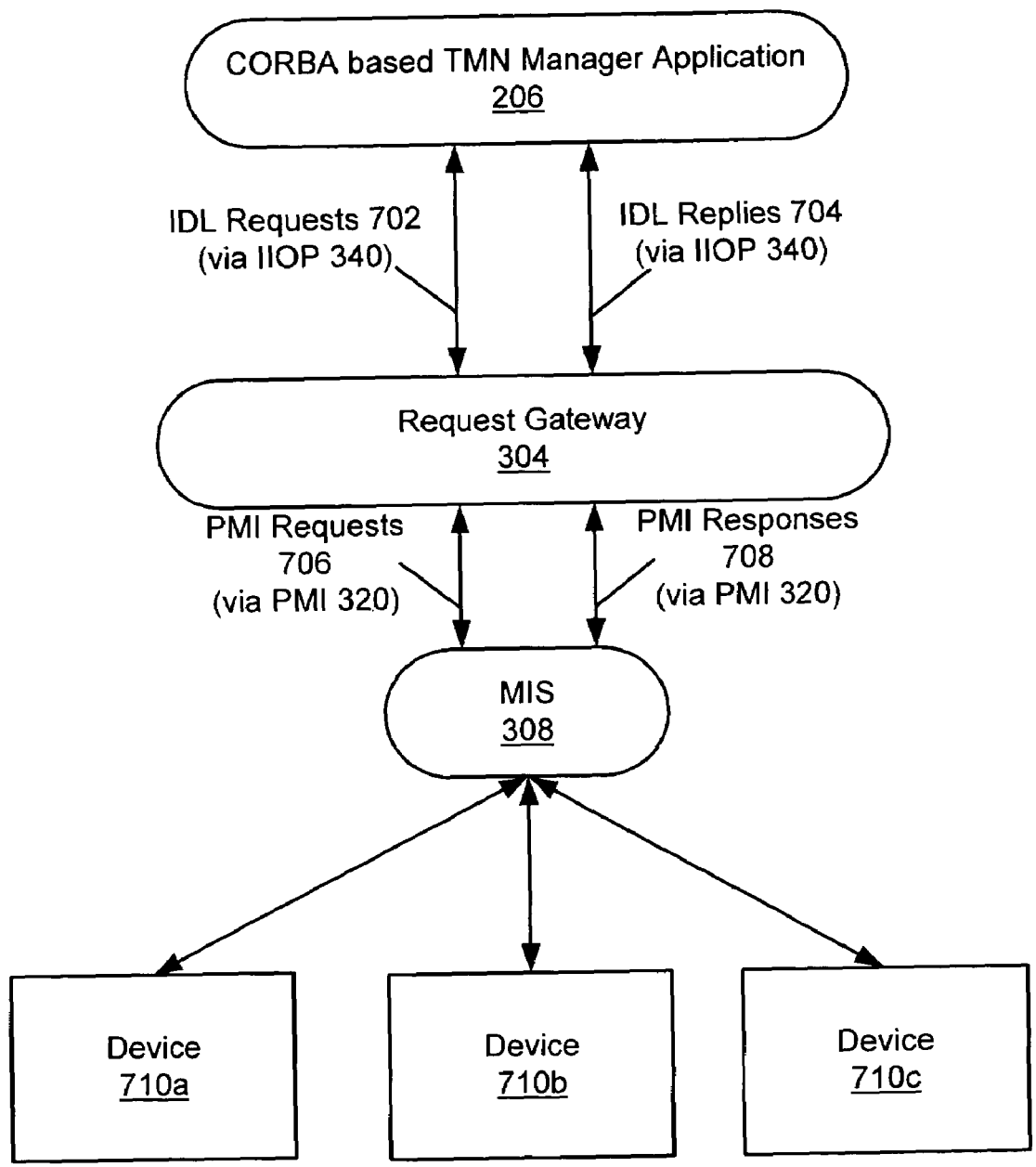
FIG. 7 is an illustration of a CORBA request gateway coupled to an MIS and managed devices according to one embodiment.

Various embodiments of the CORBA Gateway 208 may include one or more components such as a Metadata Gateway, an Event Gateway (as shown in FIG. 3), and a Request Gateway (as shown in FIG. 7). The Metadata Gateway may provide manager applications 206 with metadata relating to the managed devices. The Metadata Gateway may employ a mapping system to translate managed object data and/or metadata between various data formats, such as OMG IDL and a data description language such as Abstract Syntax Notation One (ASN1).

FIG. 3: Event Subscriptions Through a CORBA Event Gateway

FIG. 3 illustrates a CORBA Event Gateway which is a suitable system for implementing an event subscription service according to one embodiment. The CORBA Event Gateway 302 may be a component of the general CORBA Gateway 208. The CORBA Event Gateway may be thought of as a conceptual entity. In one embodiment, it may comprise more than one UNIX process. The high-level design philosophy of the Event Gateway 302 is to provide a platform-independent interface to EDS sinks. In particular, the approach provides a common sink for all events/notifications and uses a unique Event Port Registry to manage the subscriptions of various TMN clients that subscribe for such events/notifications.

Furthermore, the approach improves performance and scalability by allowing event sinks to be distributed. Instead of having all clients receive their events from one event sink, the approach allows clients to receive events from different sinks, thereby providing load-balancing. In one embodiment, multiple instances of CORBA-enabled EDS sinks may be running in a single system, thereby allowing different CORBA clients to receive events from different CORBA-enabled EDS sinks. However, in a preferred embodiment CORBA clients are not aware of this multitude of CORBA-enabled EDS sinks because this feature is transparent to the clients.

Generally, the approach described below provides the capability to filter events according to criteria presented by client event subscriptions. In one embodiment, the events may be filtered to enforce policy-based access control on TMN events/notifications, determining which CORBA client applications have access to which events. The filtering of events at the sink based upon client subscriptions decreases unnecessary network traffic in that events may be "pushed" to the client, rather than delivered upon client request or the client having to filter all requests itself. This is a substantial improvement over standard polling approaches. In addition, the approach may provide easy-to-use IDL APIs that allow CORBA clients to directly subscribe/unsubscribe to events based on criteria such as object class, object instance, and event type. For example, a print manager application may subscribe to all events relating to the toner supply of laser printers of a particular make and model. The IDL APIs may allow clients to choose the format (e.g., text or ASN1) in which the events are received, which is described in more detail in the section titled "Client-Selected Format", below. The use of IDL may provide a platform-independent interface to deliver events generated by one or more managed objects to manager applications through the Event Gateway 302. Event subscriptions may be managed with services provided by an event port registry server, described below.

EventPortRegistry Server, EventPortFinder and EventPortFactory

As shown in FIG. 3, an EventPortRegistry Server 320, an Event Distribution System (EDS) 330, a Management Information System (MIS) 308, a Request Gateway 304, and one or more TMN Manager Applications 206 may be communicatively coupled to one another as appropriate, e.g., via Internet Inter-Object Protocol (IIOP) 340. The MIS 308 provides an interface through which requests and events may be communicated with managed objects on the network. Events originating with a managed object may be passed by the MIS 308 to the EDS Source 338, which routes the message to an EDS Sink 332, where event filtering may occur in accordance with client subscription specifications. The EDS Sink 332 may then determine which clients are to receive the event and route the event to the appropriate ports, which correspond to the subscribing clients. In this manner, events may be filtered at the sink level rather than on the client side, which greatly reduces network traffic.

In one embodiment, the EventPortRegistry Server 320 includes an EventPortFactory 322, an EventPortFinder 324, and an EventPortRegistry 326. The EventPortFactory 322, EventPortFinder 324, and EventPortRegistry 326 may be implemented as CORBA objects, and the Event Gateway 302 may provide public IDL interfaces for these objects. In one embodiment, the EventPortFinder 324 and EventPortFactory 322 CORBA objects are singleton objects for the entire system (e.g., one instance of an enterprise manager). CORBA client applications may receive their events through EventPort 328 objects, which are typically created one per CORBA client application 206.

In one embodiment, EventPortFactory 322 and EventPortFinder 324 server objects may be implemented in a separate stand-alone light-weight server. This server may act as an EventPortRegistry 326 (private CORBA object). The CORBA objects (factory and finder) may be designed as tie classes that forward their requests to EventPortRegistry 326. As mentioned above, the EventPortRegistry 326 may enable client managers to subscribe and unsubscribe to various events, based upon object class, object instance, and event type.

It should be noted that EventPortRegistry 326 may be a private CORBA object to be used for inter-process communication between EDS sinks 332 and the registry. For example, when the registry process starts up, it may create the EventPortRegistry 326 CORBA object with a well-known name, "EventPortRegistry", registered with the CORBA NamingService under the name "Private:<MIS>". Then, the server may proceed to create EventPortFinder 324 with the name, "EventPortFinder" under "<MIS>" node. Finally, the server may create the EventPortFactory 322 with the name, "EventPortFactory" under "<MIS>" node. The factory and the finder may simply use the registry to create or find EventPort 328. In one embodiment, users may choose the encoding or format of the event information field of events.

EventPortRegistry 326 may then validate a ProxyAgent object reference. In one embodiment, a ProxyAgent is an entity through which a manager 206 deals with a managed object. The ProxyAgent may provide IDL methods to allow registration for events by object class, name, or event type. If the validation succeeds, then the registry will proceed with creating the port. Otherwise, an appropriate exception may be raised. After the validation succeeds, the registry may check whether the port already exists, and if so, an exception may be raised. In other words, there should be a one-to-one mapping between EventPorts 328 and Application Entity Titles (AE-Titles) in the given domain. AE-Titles are from the TMN/CCITT standards and are used to identify applications. For example, if one wants to talk to a given Event Gateway running on a given server, one could assign it an AE-Title "EGW1." Similarly, if one has a client application (or a manager application) that wants to listen or subscribe to events, it may assign itself an AE-Title so that Event Gateway 302 knows to whom to send any events when they occur. Finally, the registry may create an EventPort CORBA object 328.

Clients Registering for Events and EDS Sinks

In one embodiment, an Event Distribution Server (EDS) 330 which is coupled to the event port registry server 320 is configurable to listen for events generated by the one or more managed objects and to deliver the events to the one or more managers 206, depending upon the managers' event subscriptions and event access control.

As FIG. 3 shows, the EDS 330 may include an EDS Source 338 and one or more EDS Sinks 332. In one embodiment, a CORBA client 206 may listen for events by creating and registering EventPorts 328 and creating an Event Forwarding Discriminator (EFD). When the create request is processed by the CORBA Request Gateway 304 and sent to the MIS 308, the EFD may process this create request and send the AE-Title as a listener to one of the EDS Sinks 332. The EDS code will preferably take care of this automatically. The CORBA Request Gateway 304 ensures that it passes the user information in the create request. The AE-Title along with the user information and CMIS filter is passed to the EDS Sink 332 to make it an event listener. In one embodiment, the user information may be required to enforce access control on outgoing events. In one embodiment, each EDS Sink 332 may maintain an instance of CORBAEventDispatcher that will be responsible for actually dispatching CORBA events to CORBA clients 206.

When the EDS Sink 332 gets an event, it may retrieve the appropriate EventPort from the EventPortRegistry server and dispatch the event. Note that a CORBA client 206 may be served by any of the EDS sinks 332, and there may be more than one instance of EDS sink in the enterprise manager. Different CORBA clients may be served by different EDS sinks. In one embodiment, this is all done transparently by the existing EDS code.

Figure 4:
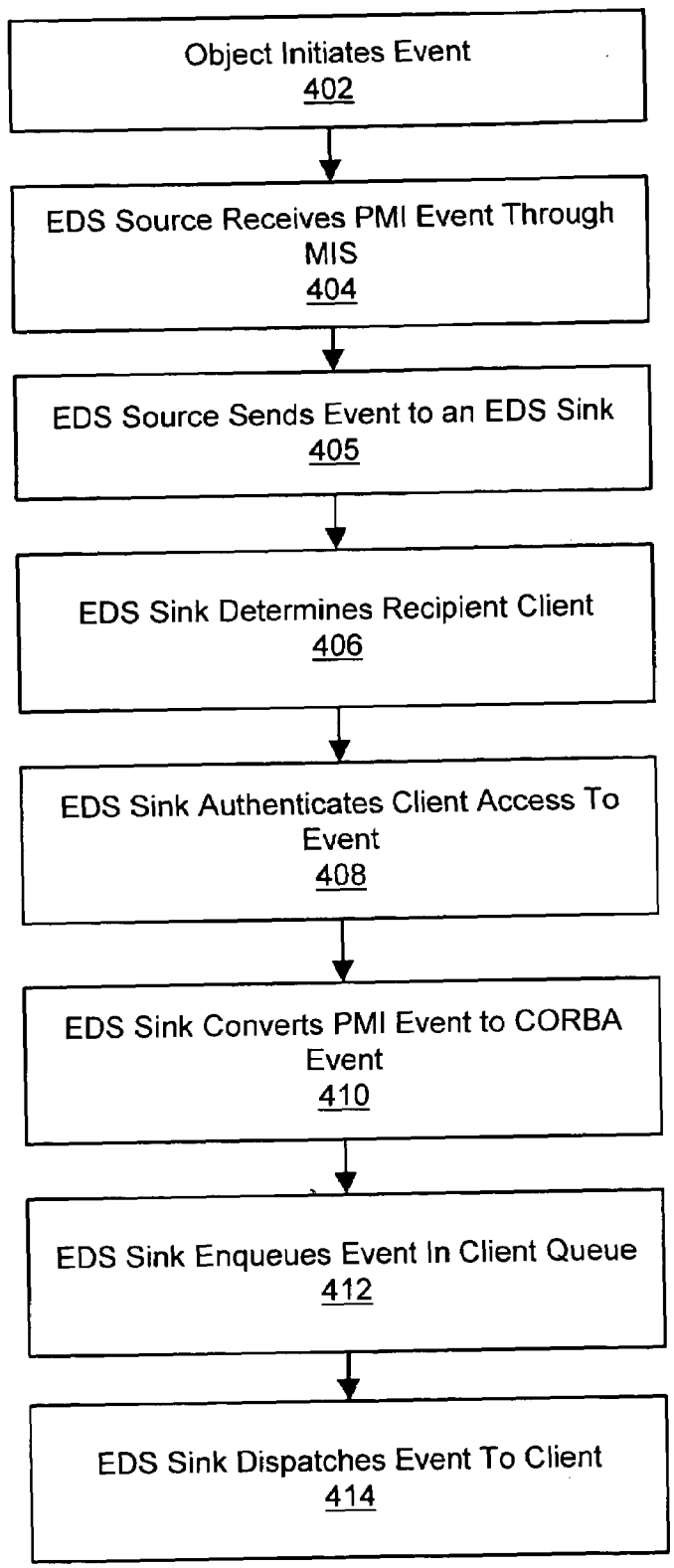
FIG. 4 is a flowchart of the dispatching of CORBA events to CORBA clients according to one embodiment.

FIG. 4: Dispatching CORBA Events to CORBA Clients

FIG. 4 illustrates a method of dispatching CORBA events to CORBA clients 206 using the Event Gateway 302 according to one embodiment. In 402, a managed object initiates or generates an event. Events may include notifications, warnings, or alarms concerning a status or occurrence relating to the managed object or corresponding device. For example, an event may be generated when a monitored device experiences an error which causes it to suspend operation. Of course, events may also be generated under less critical circumstances. For example, a monitored device may generate a notification if usage of a particular resource reaches a particular threshold, such as a printer running low on toner or a background process exceeding a threshold percentage of CPU usage.

In 404, an EDS Source 338 receives the event through MIS 308. In one embodiment, the event may be transferred to the EDS Source 338 through PMI or another suitable interface, such as a platform-specific interface. The EDS Source 338 serves to collect all incoming events and route them to Sinks 332, which may act as filters to restrict the targets to which the events may be sent. In 405, the EDS Source 338 sends the event to an EDS Sink 332. In 406, the EDS Sink 332 may find the appropriate manager 206 for the event message. Because the EDS Sink 332 has the AE-Title associated with the client, it may query the EventPortRegistry to retrieve the corresponding event port through which to send the event. In 408, access control checks may be performed by comparing the client manager ID with access privilege information. This ensures that the client manager 206 is authorized to receive the event. That is, the gateway may authenticate access of the manager 206 to the event. In one embodiment, the authentication may involve the use of pluggable authentication modules, described below with reference to FIGS. 12, 13, 14, and 15. In 410, the EDS Sink may then convert the event (as sent through PMI, for example) into a CORBA event, i.e., an event expressed in IDL. In 412, the EDS Sink may enqueue the event in a queue corresponding to the particular manager 206. This queue is required to ensure ordered delivery of events to the consumer. In particular, the delivery of events may occur in the order in which the events are generated. In 414, the EDS Sink may dispatch the event to the client 206.

Event Gateway Access Control

In one embodiment, the Event Gateway 302 may provide object-level access control between manager applications and managed objects. Therefore, manager application access to managed objects may be granted at the individual object level. That is, a given manager may be granted access to particular events while being prevented from interfacing with others. In one embodiment, the client manager 206 may first be authenticated to the Event Gateway 302 by username and password, or other validation information associated with the client manager 206, which may be represented in a user profile. In one embodiment, the authentication may involve the use of pluggable authentication modules, described below with reference to FIGS. 12, 13, 14, and 15. Once the initial client authentication is accomplished, the client manager may be further authenticated for each event type at the individual object level. In other words, the Event Gateway 302 may check the client manager's privilege to receive events from a given managed object. In one embodiment, the client manager's user ID may be used to access subscription records to determine whether the client manager has access to a managed object associated with a particular event.

In one embodiment, this design uses thread pools to provide multiple threads delivering events to multiple consumers. If one consumer is slow in processing events, other consumers should not be adversely affected. This design allows the flexibility to assign scheduling priorities to different threads. The concurrency level of the thread pool can be configured for optimal concurrency levels (thought to be 5 or 10 on dual CPU computer systems). Thread pools are discussed in greater detail with reference to the section below entitled "Managing CORBA Events, Requests, and Replies with a Thread Pool."

Figure 5:
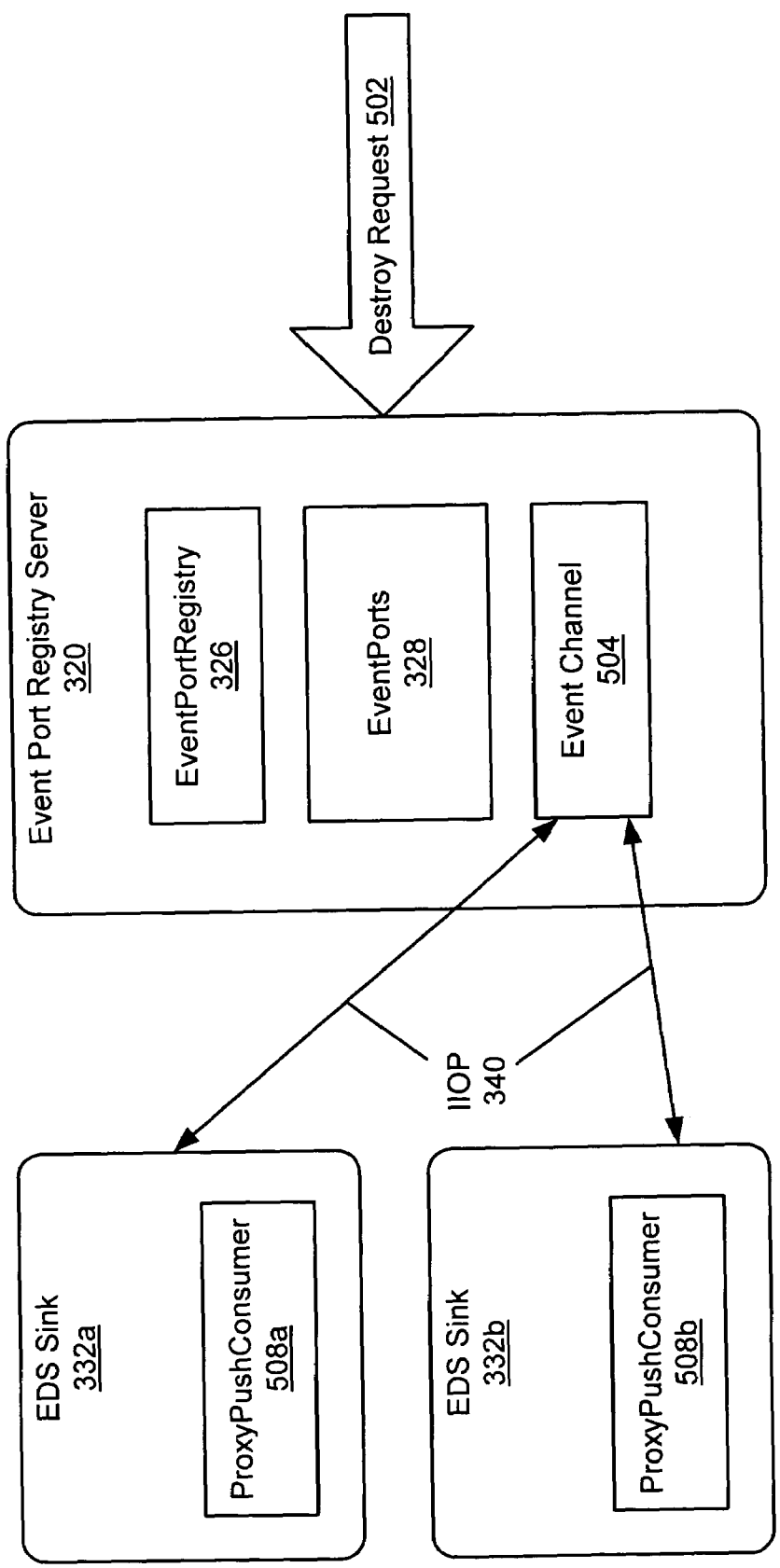
FIG. 5 illustrates a system for deletion of event ports according to one embodiment.

FIG. 5: Deletion of EventPorts

FIG. 5 is a block diagram illustrating the deletion of an EventPort 328 according to one embodiment. Event ports may be destroyed when explicitly requested by a client application, upon client application disconnect from the gateway, or upon client destruction of a proxy agent. Consumers (e.g., managers 206) may destroy an EventPort 328 via a request 502 to the EventPortRegistry 326 (a component of the EventPortRegistry Server 320, as illustrated in FIG. 3). EventPortRegistry Server 320 receives this destroy request 502 and destroys the EventPort 328. For the purpose of notifying EDS sinks 332 that may be interested in knowing when EventPorts 328 are destroyed, a separate private CORBA EventChannel 504 may be created. The private CORBA EventChannel 504 may be shared by the registry server 320 and EDS sinks 332. Each EDS sink 332 may create a private ProxyPushConsumer 508 and connect to the private CORBA EventChannel 504. When an EventPort 328 is destroyed, the registry server 320 may send a CORBA event (with AE-Title of the EventPort) to the private CORBA EventChannel 504. EDS sinks 332 receive this event and clean up their consumer lists. In one embodiment, this process will not remove the corresponding EFD because EFDs may be persistent. In one embodiment, EFDs may be removed explicitly by the client. In another embodiment, a client wishing to delete an event port may be subject to authentication by the event gateway before being allowed to delete the event port, such as by a pluggable authentication module, discussed below with reference to FIGS. 12, 13, 14, and 15.

Note that there may be instances when the client program may die or exit without destroying EventPorts 328. This may be intentional so that the client application 206 can come back up and continue with the old EventPort 328. In one embodiment, the only other valid signal to Event Gateway is when the event channel between the CORBA client and Event Gateway 302 is broken down, when EventPorts can be cleaned up.

Figure 6:
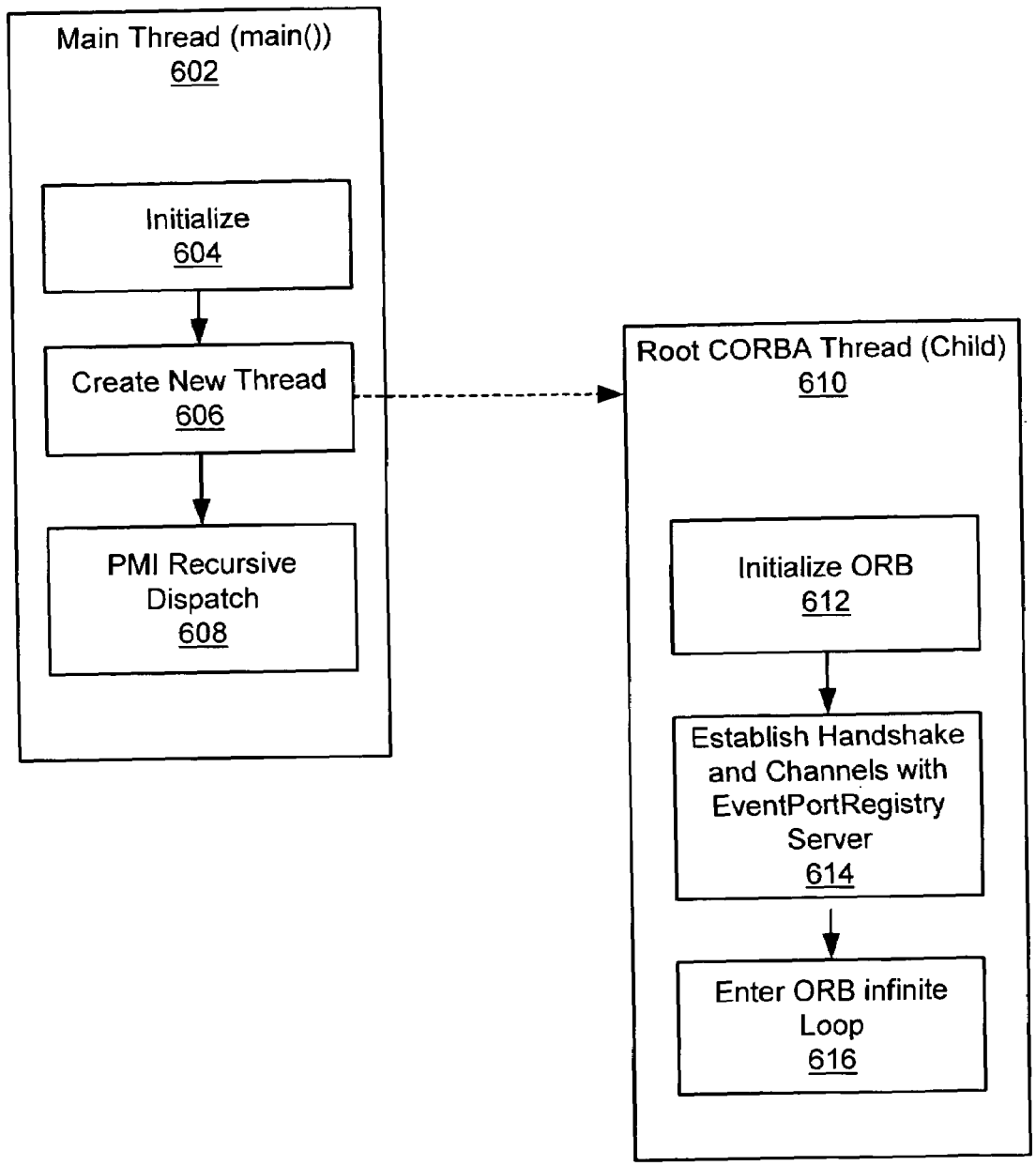
FIG. 6 illustrates EDS sink initialization according to one embodiment.

FIG. 6: EDS Sink Initialization

An EDS sink may be initialized when a client event subscription specifies a set of filtering criteria not represented by a currently existing sink. In one embodiment, EDS sinks 332 may be initialized in the following manner. As shown in FIG. 6, when the EDS sink 332 starts, the main process may be running on the main thread 602, which is the thread on which PMI's recursive dispatch process (608) may be running. The existing initialization code may first be executed in 604. Before entering PMI's recursive dispatch process, the main process may spawn in 606 a new thread 610 to run the CORBA code. This new thread 610 may be a root CORBA thread (a child of the main thread). The root CORBA thread may then initialize the ORB in 612, establish communication channels with the EventPortRegistry server in 614, and then enter the ORB's infinite loop in 616. In one embodiment, a client may be subject to authentication by the event gateway before being allowed to initiate a new subscription specification, such as by a pluggable authentication module, discussed below with reference to FIGS. 12, 13, 14, and 15.

FIG. 7: CORBA Request Gateway with MIS and Managed Devices

FIG. 7 illustrates a CORBA Request Gateway coupled to an MIS and managed devices according to one embodiment. As FIG. 7 shows, in one embodiment, a manager application 206 is communicatively coupled to a Request Gateway 304 via IIOP 340, such that platform-independent (e.g., IDL) requests 702 may be sent to managed devices 710 through the Request Gateway 304. The Request Gateway 304 may translate the platform-independent requests 702 into PMI requests 706, and send the translated requests 706 to a Management Information System (MIS) 308 via PMI 320. The MIS 308 may then send the requests to the appropriate managed devices (objects) 710. In one embodiment, the MIS may send the requests to the managed devices through one or more management protocol adaptors (MPA). An MPA may be used to translate requests into a format required by particular devices, such as SNMP or CMIP. Requests may include, for example, requests for status information, requests for managed devices to perform particular tasks, and other suitable tasks.

Once a device 710 has received the requests, it may send responses back to the manager application 206. It does this by first sending the responses to the MIS 308, which passes the responses to the Request Gateway 304 in the form of PMI responses 708 via PMI 320. The Request Gateway may then translate the PMI responses 708 into platform-independent (e.g., IDL) replies 704, which are sent to the manager application 206 via IIOP 340. For example, if the request were a query for the on/off status of a printer, the response may include the value of that status. In one embodiment, client manager applications 206 may be subject to authentication by the Request Gateway 304 before access to the Request Gateway services is allowed, as well as before each request is sent. Such authentication may be performed, for example, by a pluggable authentication module, discussed below with reference to FIGS. 12, 13, 14, and 15.

Figure 8:
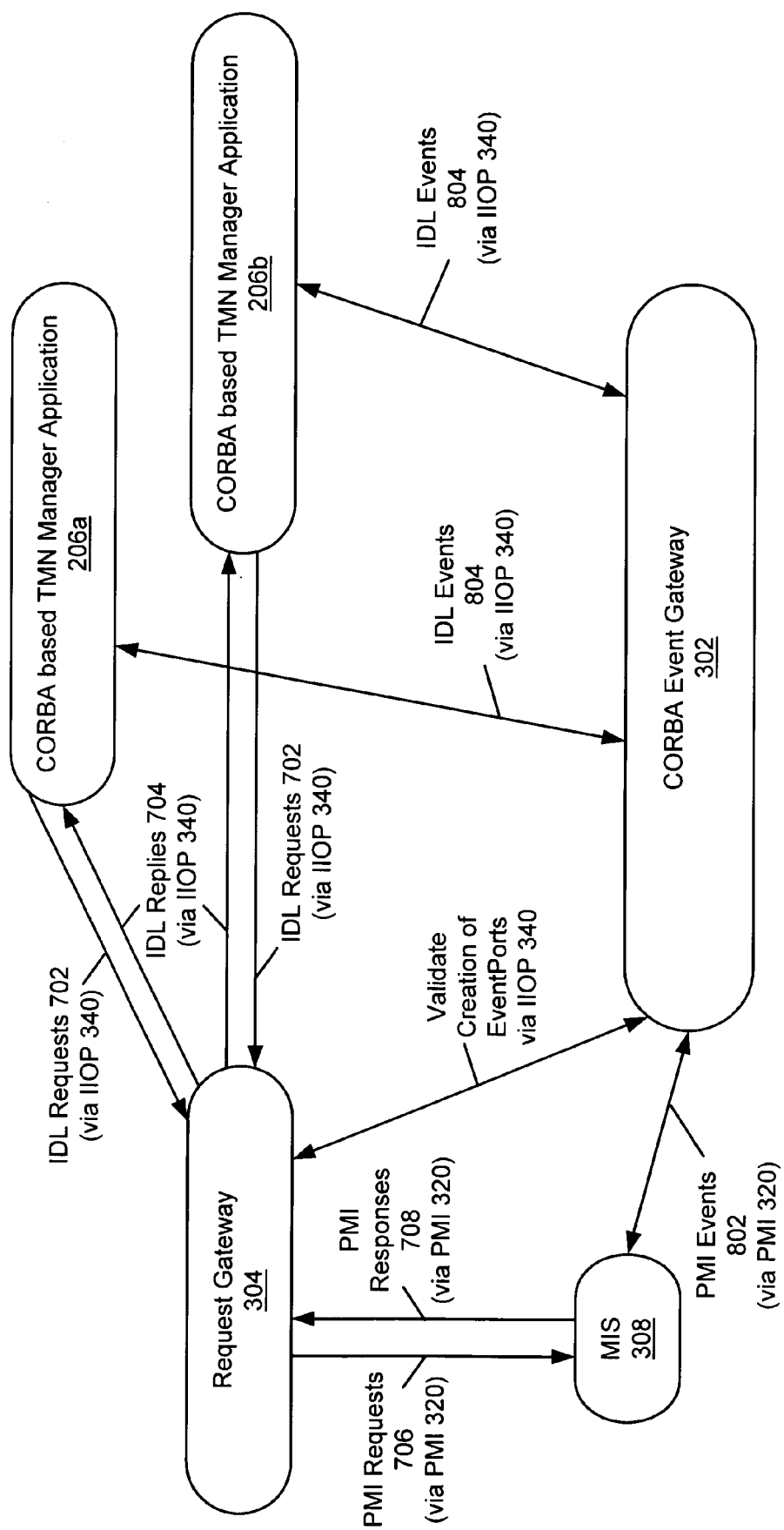
FIG. 8 is an illustration of a CORBA request gateway according to one embodiment.

FIG. 8: CORBA Request Gateway

FIG. 8 further illustrates the CORBA Request Gateway according to one embodiment. The CORBA Request Gateway 304 may be a component of the general CORBA Gateway 208. In one embodiment, the CORBA Request Gateway 304 is a separate process that handles all the TMN management requests (except events) as expressed in IDL. Managed devices (or corresponding managed objects) may issue responses to the requests, such as requested status information or confirmation of the performance of a requested task. As shown in FIG. 8, an Event Gateway 302, a Management Information System (MIS) 308, a Request Gateway 304, and one or more client TMN Manager Applications 206 may be communicatively coupled to one another as appropriate via Internet Inter-Object Protocol (IIOP) 340. Furthermore, the Request Gateway may be communicatively coupled to MIS 308 via an interface such as PMI 320, as described above with reference to FIG. 3.

The Request Gateway 304 may be operable to accept the management requests 702 in IDL via IIOP 340, translate them into low-level PMI 320 requests 706, and send those PMI requests to a Management Information System (MIS) 308. MIS 308 may interface with managed objects on the network by passing requests to objects and receiving responses. When MIS 308 sends back the responses 708 to the Request Gateway 304, the Request Gateway 304 translates the responses 708 into IDL replies 704 and sends the replies 704 to the CORBA client manager application 206. As used herein, the term "response" is used to refer to the PMI responses 708 that MIS 308 sends to the Request Gateway 304, whereas the term "reply" is used to refer to the IDL replies 704 that are sent to the CORBA client 206. The use of IDL/CORBA as the interface between manager applications and managed objects provides a platform-independent approach to managing object-related requests.

Security/Audit Trails

In one embodiment, the Request Gateway 304 may provide the Manager Applications 206 access to an MIS 308 service that provides security/audit trails of TMN management/object transactions. The Request Gateway 304 does this by providing a platform-independent way to turn on/off the security/audit trails via, e.g., request cmis_get/cmis_set operations on the managed object, as well as providing user information in each request sent to the MIS. The security/audit trail service provided by the MIS 308 may include a logging function which may be used to track event or request related traffic and save information such as which client sent the request/event, when the request/event occurred, and the nature of the request/event, or any other information useful for security and auditing purposes. In one embodiment, the MIS 308 security/audit service provides an "all or nothing" capability, in that either all information for all traffic may be logged, or nothing is logged. In one embodiment, the Manager Applications 206 may be subject to authentication before being allowed access to the security/audit trail service, such as by a pluggable authentication module, discussed below with reference to FIGS. 12, 13, 14, and 15.

Figure 9:
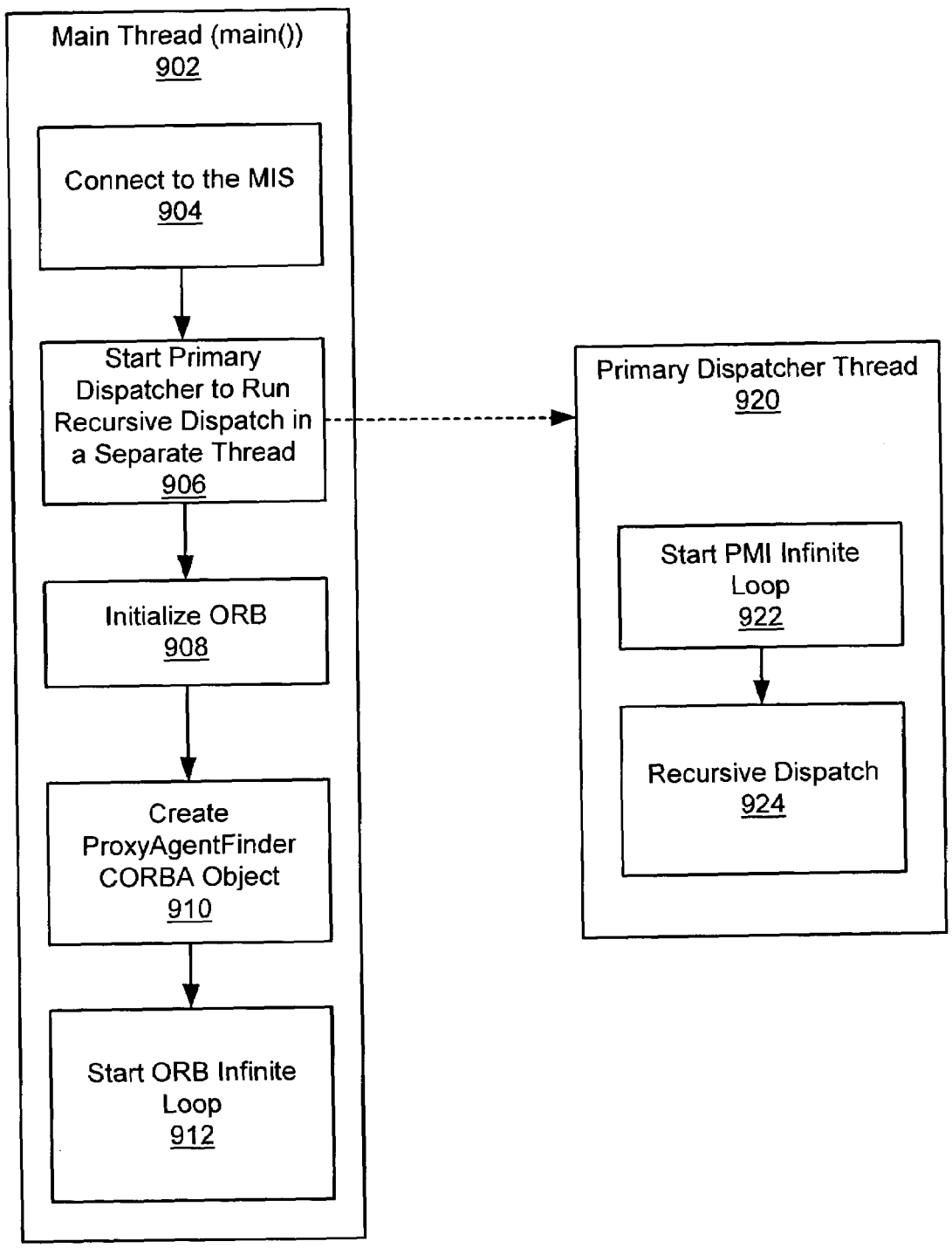
FIG. 9 illustrates a CORBA request gateway initialization procedure according to one embodiment.

FIG. 9: Request Gateway Initialization

FIG. 9 illustrates a Request Gateway 304 initialization process according to one embodiment. As FIG. 9 shows, when the Request Gateway 304 starts up in a main thread 902, it first connects to the MIS in 904. In one embodiment, Request Gateways 304 may not be shared by more than one instance of an MIS 308. In other words, one instance of a Request Gateway 304 may only connect to one instance of an MIS 308. In alternate embodiments, this restriction may be relaxed. However, the Request Gateway 304 may run on a different machine than the one on which the MIS 308 is running. As mentioned above, client manager applications may be subject to authentication by the Request Gateway before access to the Request Gateway services is allowed, such as by a pluggable authentication module, discussed below with reference to FIGS. 12, 13, 14, and 15.

In 906, the Request Gateway 304 may then spawn a new thread to run PMI's recursive dispatch in its own thread, referred to as the primary dispatcher thread 920. This design option may be employed because of the complexities and problems that may arise when the ORB and PMI loops are integrated into one loop. The individual loops may lose full functionality when they are merged, and the fact that ORB loops are multi-threaded may causes problem when the ORB loop integrated with the single-threaded PMI loop. Moreover, keeping the loops in separate threads may improve performance as CORBA requests and replies may be executed in parallel to the execution of PMI requests and responses. In the primary dispatcher thread 920, the PMI infinite loop is started in 922, and the recursive dispatch process is executed in 924.

After spawning the primary dispatcher thread 920, the Request Gateway 304 may post a callback to detect MIS disconnects. The Request Gateway 304 need not listen for managed object events because, for improved performance, it is only concerned with handling requests which originate with the manager applications 206 and the corresponding responses 708 from the managed objects. Next, in 908, the gateway initializes the ORB and, in 910, creates the ProxyAgentFinder CORBA object. In one embodiment, there may be only one instance of ProxyAgentFinder CORBA object per Request Gateway 304 instance, and each ProxyAgentFinder may be associated with only one instance of MIS 308. In one embodiment, these restrictions may be relaxed. To support multiple distributed gateways for a given MIS 308, there may be more than one Request Gateway 304 per MIS 308. After a ProxyAgentFinder object is created, it is registered with the CORBA Naming Service as "<MIS>"/ "<RequestGateway Host>"/"ProxyAgentFinder". Any CORBA client wishing to connect to the Request Gateway 304 may first contact the CORBA Naming Service to get the ProxyAgentFinder CORBA object associated with the name "<MIS>"/"RequestGatewayHost"/"ProxyAgentFinder". The Request Gateway 304 may enter the ORB's infinite loop in 912.

Object-Level Access Control

In one embodiment, the Request Gateway 304 may provide object-level access control between manager applications and managed objects. Therefore, manager application access to managed objects may be granted at the individual object level. That is, a given manager may be granted access to particular objects while being prevented from interfacing with others. In one embodiment, a client manager application may be subject to authentication by the Request Gateway before being granted access to managed objects, such as by a pluggable authentication module, discussed below with reference to FIGS. 12, 13, 14, and 15.

In one embodiment, object-level access control may be enforced by use of a Request Service Access Point (Request-SAP). RequestSAP may be a singleton object that may be shared by all ProxyAgents. A regular application Service Access Point (SAP) does not allow the insertion of the user name in the request message to enforce object-level access control, and therefore a request SAP is recommended to send PMI requests and receive PMI responses with appropriate object-level access control enforced. When a send request is invoked, the primary response callback may be installed. This is the callback that first gets invoked for any response from the MIS 308. The primary response callback may retrieve the response message and post a secondary response callback instead of processing the callback directly. The primary response callback does not invoke a reply because the reply may directly or indirectly invoke the recursive dispatch. If this happens, the recursive dispatch may end up in deep recursion, possibly causing the process stack size to overflow and dump core. Further details of the Request Gateway's object-level access control are given below with reference to client application authentication to the Request Gateway 304, described below.

Authentication of Client Applications to the Request Gateway

In one embodiment, user information may be included with each request sent to a managed object through the MIS 308. The MIS 308 may then use this information to determine whether the user has access to that particular object. In one embodiment, the MIS 308 may check the user ID against an authentication list or table which contains user/object access information. In addition, client authentication may be performed upon client connection to the Request Gateway, described below.

Any CORBA client 206 wishing to connect to the Request Gateway 304 may first contact the CORBA Naming Service to get the ProxyAgentFinder CORBA object associated with the name "<MIS>", "ProxyAgentFinder". Then the client 206 may invoke the ProxyAgentFinder domain access IDL method to connect to the Request Gateway 304. Note that the domain access method may also be used to retrieve existing connections for that client 206. The client 206 may pass a key to the Request Gateway. In one embodiment, this key may not have any significant functionality other than identifying whether the ProxyAgent should be for OSI or SNMP management. The client 206 may then fill in the appropriate criteria (which is a list of tuples <name, value>, where <name> is an IDL string, and <value> is CORBA:: Any), described in the table below according to one embodiment.

TABLE 1

Criteria for ProxyAgents

| Criteria Name | Type of Value | Semantics |
| --- | --- | --- |
| "domain title" | string | Value must be the name of the MIS that client wants to connect to. This criteria is MANDATORY |
| "gateway title" | string | Value must be the name of the gateway (typically a host name) that the client wants to connect to. The value defaults to some randomly |

TABLE 1-continued

Criteria for ProxyAgents

| Criteria Name | Type of Value | Semantics |
| --- | --- | --- |
| | | assigned gateway, typically the gateway that is running on the MIS host. This criterion is OPTIONAL. This criterion allows gateway instances to be distributed and is for future use. |
| "controller object" | JIDM::ProxyAgent-Controller | Value must be a CORBA object reference of JIDM::ProxyAgentController object which is created by the manager (client) application. This criterion is OPTIONAL. |
| "user profile" | Any | Value is opaque. Its usage is described below. Value is used to extract the username and password. This criterion is MANDATORY. |
| "manager title" | String | Title used to denote the Manager (client) which requested access to the OSI managed object domain. This criterion is OPTIONAL. |

In one embodiment, the related enterprise manager may be Solstice Enterprise Manager™ (SEM) available from Sun Microsystems, Inc. To maintain the same access control features that exist in SEM, the criteria may require a username and password (in encrypted form). To enable the CORBA clients to send the password in encrypted form, a wrapper library (e.g., implemented in C++) may be provided which contains an encryption function similar to that currently used in PMI 320. The client may pass in CORBA 'any' which contains the user profile (opaque to the CORBA Gateway 208). In one embodiment, a class library may be provided to allow pluggable authentications, described below with reference to FIGS. 12, 13, 14, and 15. In this manner, the Request Gateway 304 may be operable to authenticate client managers. Note that because SEM does not support AE-Titles publicly for MIS 308, the approach may use a string that specifies the name of the MIS 308.

In one embodiment, a client application 206 may provide its own authentication interface in the form of a pluggable authentication module, described below with reference to FIGS. 12, 13, 14, and 15. When the client 206 wants to create a Proxy Agent, it sends the user profile criteria in 'any' (which is recommended to be encrypted in whatever form the user chooses). The Request Gateway 304 may then invoke a decryption function to extract the user name and password from the encrypted user profile. The Request Gateway 304 may then use the standard login to authenticate the username and password. In one embodiment, the enterprise manager may provide a default C++ implementation of the above-mentioned wrapper library, which may be replaced by the client 206 with its own implementation.

The Request Gateway 304 may then send a create request for an application instance object. The create request may contain the client's username. This request may be used to subject the client 206 to object-level access control. To do this, the Request Gateway 304 may create a RequestSAP to send the request, as described above. If the creation succeeds, then the Request Gateway 304 may proceed to create a Proxy Agent CORBA object, store it in a proxy agent list, and return a reference to it to the client 206; otherwise, an exception may be raised.

The Proxy Agent may store the key and criteria. When a destroy function is called on the Proxy Agent, a client-implemented Proxy Agent Controller may be contacted to determine whether the destruction may be allowed. If allowed, the Proxy Agent object may be destroyed, after which the Proxy Agent Controller object may be destroyed. The purpose of the Proxy Agent Controller is to notify the client application 206 when the Proxy Agent is about to be destroyed, as well as when destruction has occurred.

Client-Selected Format

As mentioned above, in some embodiments, the client 206 may choose the format in which to send and receive information such as events, requests, notifications, etc. To provide text based requests and replies, an extension IDL interface may be used. For example, a new IDL interface may be provided which extends ProxyAgent. The tie mechanism may be used to create the concrete version of the ProxyAgent object. The extensions may allow clients to send requests and receive replies using values in text form rather than in CORBA::Any (i.e., ASN1 <any>). The text form values may retain the same format as that of PMI.

The JIDM standard does not explicitly mandate the IDL format of events. In one embodiment, the following IDL may be used for event reports:

```
struct EventReport {
    string  event_type;
    string  object_class:
    string  object_name;
    string  event_time;
    any     event_info;
};
```

Note that the CORBA ASN1 generic data type <any> is used to store event information. For receiving event_info in a string format for text-based events, the following structure may be used:

```
struct EventReport {
    string  event_type;
    string  object_class:
    string  object_name;
    string  event_time;
    string  event_info;
};
```

Note the use of the <string> data type for storing the event information. The use of text format may greatly reduce the network traffic related to requests and responses. It should be noted that in other embodiments, various other data formats may be used to store event information.

Managing CORBA Events, Requests, and Replies with a Thread Pool

In one embodiment, the Event Gateway 302 and the Request Gateway 304 may be designed as multi-threaded systems. A mechanism may be provided to prevent any single client 206 from overloading the system, including denial of service attacks. A thread pool may be used to minimize thread creation and deletion inefficiencies. If a client sends an excessive number of requests to the system, the client may be assigned only one thread from the thread pool in order to preserve resources for other clients. In one embodiment, there may be one thread pool (reply thread pool) per Request Gateway 304. This reply thread pool may initially have a concurrency of 3. The thread pool may enhance the performance of sending replies to clients because the send reply method may be a blocking call. A thread pool may improve the response time to different CORBA clients 206 even in the presence of a few slow CORBA clients 206, in that the slow CORBA clients 206 may be isolated in their respective threads away from the other clients.

In one embodiment, each ProxyAgent instance may have a reply dispatcher, which may schedule replies to that particular client 206 in sequential order (the same order in which the client 206 issued the requests). In this way, message ordinality may be preserved. Similarly, the client 206 may receive replies for a given request before receiving any replies for any subsequent requests. One approach to preserving message order in a thread-safe manner is through the use of a synchronous task scheduler with the thread pool, described below.

Figure 10:
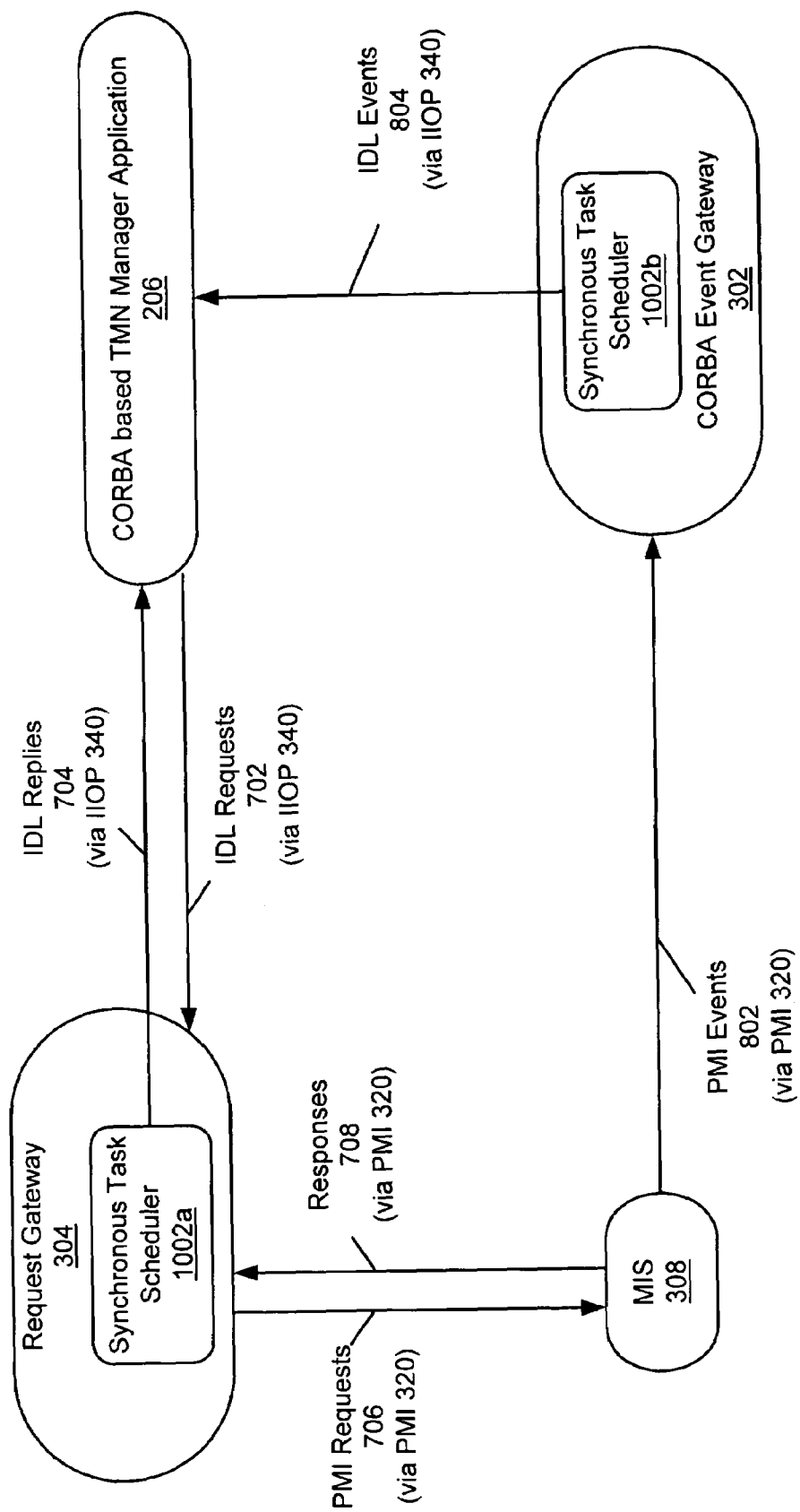
FIG. 10 illustrates a synchronous task scheduler according to one embodiment.

FIG. 10: Synchronous Task Scheduler

To ensure ordered delivery of events or replies to the CORBA gateway clients in a multi-threaded environment using a thread pool, a synchronous task scheduler may be used. The primary utility of the synchronous task scheduler is that it leverages the efficiency and scalability of a thread pool while preserving the order of events, requests, and replies. There may be a synchronous task scheduler associated with each client manager to preserve the chronology of messages sent to each.

As FIG. 10 shows, the Request Gateway 304 and the Event Gateway 302 are communicatively coupled to a client manager application 206 via IIOP 340, as well as the MIS 308 via PMI 320. The Request Gateway 304 is operable to receive IDL requests 702 from the client manager 206, translate the IDL requests 702 to PMI requests 706 and deliver the PMI requests 706 to the MIS 308, through which various managed objects may be accessed. The Request Gateway is further operable to receive managed object PMI responses 708 from the MIS 308, translate the PMI responses 708 to IDL replies 704 and send the IDL replies 704 to the client manager 206. The Event Gateway 302 is operable to receive PMI events 802 from the MIS 308, translate the PMI events 802 to IDL events 804 and deliver the IDL events 804 to the client manager 206.

When messages are to be delivered serially to the client manager application 206, such messages may be scheduled by the synchronous task scheduler 1002. The synchronous task scheduler may maintain an internal message list, and deliver one message at a time from that internal list. The synchronous task scheduler 1002 may hold a reference to a thread pool and use that thread pool to deliver messages.

In one embodiment, the Event Gateway 302 may use task schedulers 1002 to deliver managed object events serially to client managers, assigning a task scheduler 1002 to each client manager connected to the Event Gateway 302. Similarly, the Request Gateway 304 may use task schedulers to serially deliver managed object replies (to requests sent by the client managers 206) to the client managers 206, such that the replies are received by the client managers 206 in the same order the corresponding requests were sent. The Request Gateway 304 may also assign a task scheduler 1002 to each client manager connected to the Request Gateway 304.

Figure 11:
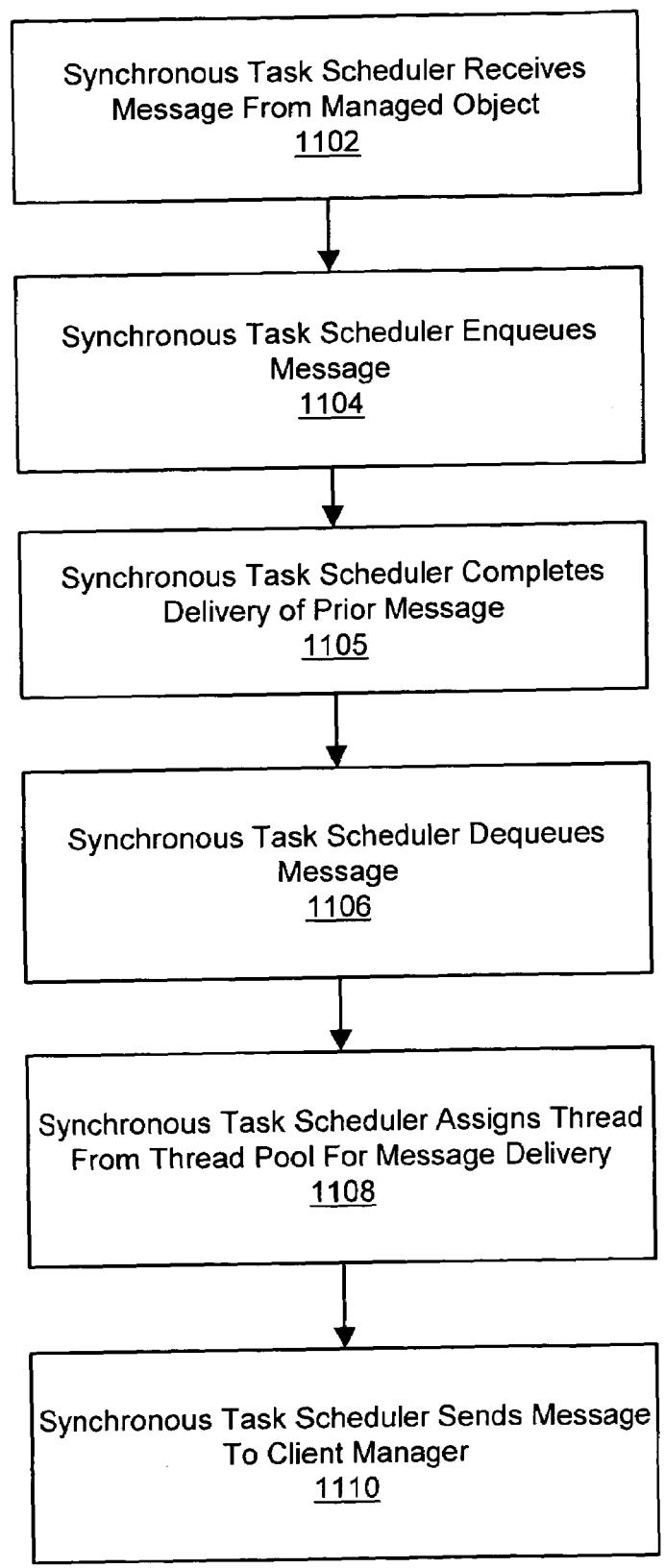
FIG. 11 is a flow chart of a synchronous task scheduling process using a thread pool, according to one embodiment.

FIG. 11: Synchronous Task Scheduling With A Thread Pool

FIG. 11 illustrates the process of synchronous task scheduling using a thread pool. In 1102, when a message from a managed object is scheduled, the synchronous task scheduler receives the message, and, as indicated in 1104, enqueues the message in an internal message list.

In 1105, the synchronous task scheduler completes the delivery of a prior message, if there is one. In one embodiment, when the synchronous task scheduler receives a message, it may determine if any prior message is currently being delivered. If no prior message is currently being delivered, the synchronous task scheduler may deliver the current message immediately, rather than enqueueing the message on the message list for later delivery.

In 1106, the synchronous task scheduler dequeues the current message. Note that the use of a queue for the message list ensures that messages will be processed in the order in which they are received, because the queue is a first in, first out (FIFO) data structure.

Then, in 1108, an available thread is assigned from the thread pool for delivery of the message. Finally, in 1110, the scheduler may initiate delivery of the message, sending the message to the client manager application.

In one embodiment, when the synchronous task scheduler sends a message to the client manager, it may wait until it receives an acknowledgement of receipt from the client manager before dispatching the next message. This may be necessary because each sequential message may be delivered with a different thread, and because some threads may execute more rapidly than others, a first thread execution which is initiated before a second thread execution may actually finish after the second thread completes its execution. By restricting the messages of a particular scheduler to be delivered one at a time, the message chronology for a given client manager may be maintained.

Figure 12:
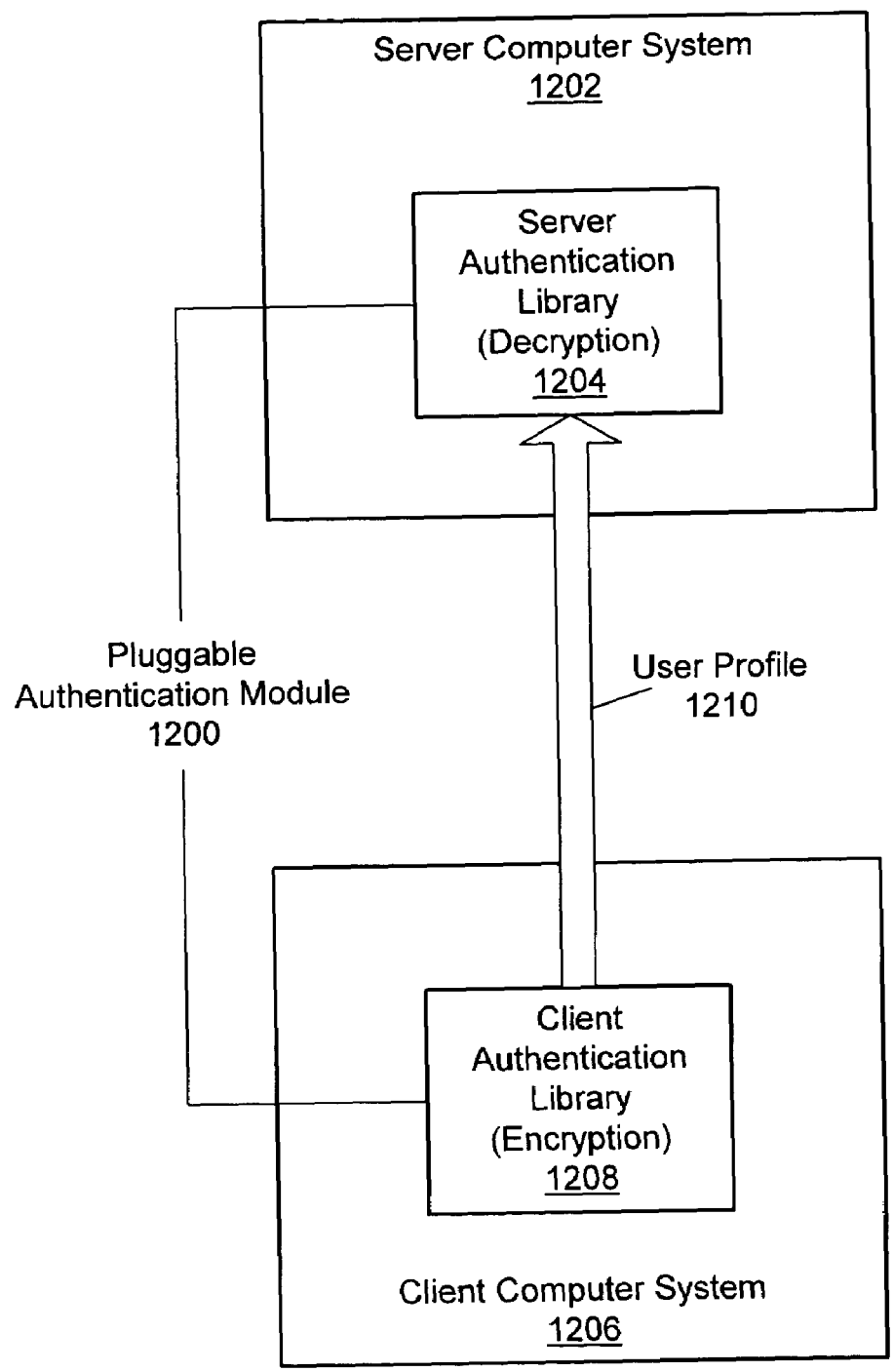
FIG. 12 illustrates a pluggable authentication module according to one embodiment.

FIG. 12: Pluggable Authentication Module

FIG. 12 illustrates a pluggable authentication module (PAM) 1200 according to one embodiment. Such an authentication system may be used by a CORBA gateway component, such as the CORBA request gateway described above. In the case of the CORBA request gateway, the PAM may be used to authenticate management requests sent by one or more manager applications before they are sent to managed objects on a network. The term "pluggable" refers to the property that a client application may provide the terms under which a user may be authenticated to the gateway simply by providing the libraries 1204 and 1208 necessary to execute the authentication scheme, as is described in further detail below. This property allows the client to select which encryption/authentication scheme is employed to authenticate a user by selecting a particular PAM.

As shown in FIG. 12, the PAM 1200 may include a client-side authentication library 1208 and a server-side authentication library 1204. The client-side authentication library 1208 may be deployed on a client computer system 1206. The client-side authentication library 1208 may provide a client-side interface which is operable to retrieve and encrypt a user profile 1210 associated with a user. The user profile 1210 which the client-side authentication library 1208 encrypts and sends to the server-side authentication library 1204 may include any information required to authenticate the user, such as the user name and a password. In one embodiment, the user profile 1210 may include a designation of a management information server (MIS) to which the user wishes to connect. In other embodiments, the user profile 1210 may include encryption keys or other information useful for user authentication. The user profile 1210 may be entered by the user in whole or part and/or retrieved from a storage device in whole or part prior to encryption.

Also shown in FIG. 12, the server-side authentication library 1204 may be deployed on a server computer system 1202 coupled to the client computer system 1206 through a computer network. The server-side authentication library 1204 may provide a server-side interface which is operable to receive the encrypted user profile 1210 from the client-side authentication library 1208 and decrypt the user profile 1210 to authenticate the user for one or more network services.

In one embodiment, the client-side library 1208 is implemented in accordance with a specification expressed in an interface definition language (IDL). The interface definition language may be operable to define object interfaces across a plurality of platforms and across a plurality of programming languages. The client-side library 1208 may also be implemented for the particular client platform corresponding to the client computer system 1206. As used herein, a "platform" includes a combination of a particular operating system, programming language, software development environment, and/or set of computing hardware for which software may be developed. The server-side library 1204 may also be implemented in accordance with the specification expressed in the interface definition language and implemented for a particular server platform corresponding to the server computer system 1202.

In one embodiment, the IDL interface for authentication may include the following AuthenticationServer and AuthenticationClient classes:

```
class AuthenticationServer {
    public:
        virtual CORBA::Boolean decrypt_user_profile(
            const CORBA::Any& user_profile_blob,
            RWCString& user_name,
            RWCString& password
        ) throw( ) = 0;
};
class AuthenticationClient {
    public:
        virtual CORBA::Any_ptr encrypt_user_profile(
            const char* user_name,
            char* password,
            const char* key
        ) throw( ) = 0;
        virtual CORBA::Any_ptr get_user_profile(
            CosNaming::NamingContext_var root_nc,
            const char* key
        ) throw( ) = 0;
};
```

In one embodiment, the client-side authentication library 1208 implements the AuthenticationClient class. For example, the client-side authentication library 1208 may implement the AuthenticationClient class using NES DES encryption. In one embodiment, the server-side authentication library 1208 implements the AuthenticationServer class. For example, the server-side authentication library 908 may implement the AuthenticationServer class using an SEM Authentication daemon to validate the DES-encrypted user identity.

In one embodiment, the server-side authentication library 1204 may be implemented in C++. The client-side authentication library 1208 may be implemented in any programming language for which there is an IDL mapping, i.e., any programming language in which the IDL interface specification mentioned above may be implemented.

In one embodiment, the client-side authentication library 1208 and the server-side authentication library 1204 may be implemented as shared dynamic libraries, allowing the client-side authentication library to be shared by a plurality of management applications and the server-side authentication library to be shared by a plurality of gateway components.

Figure 13:
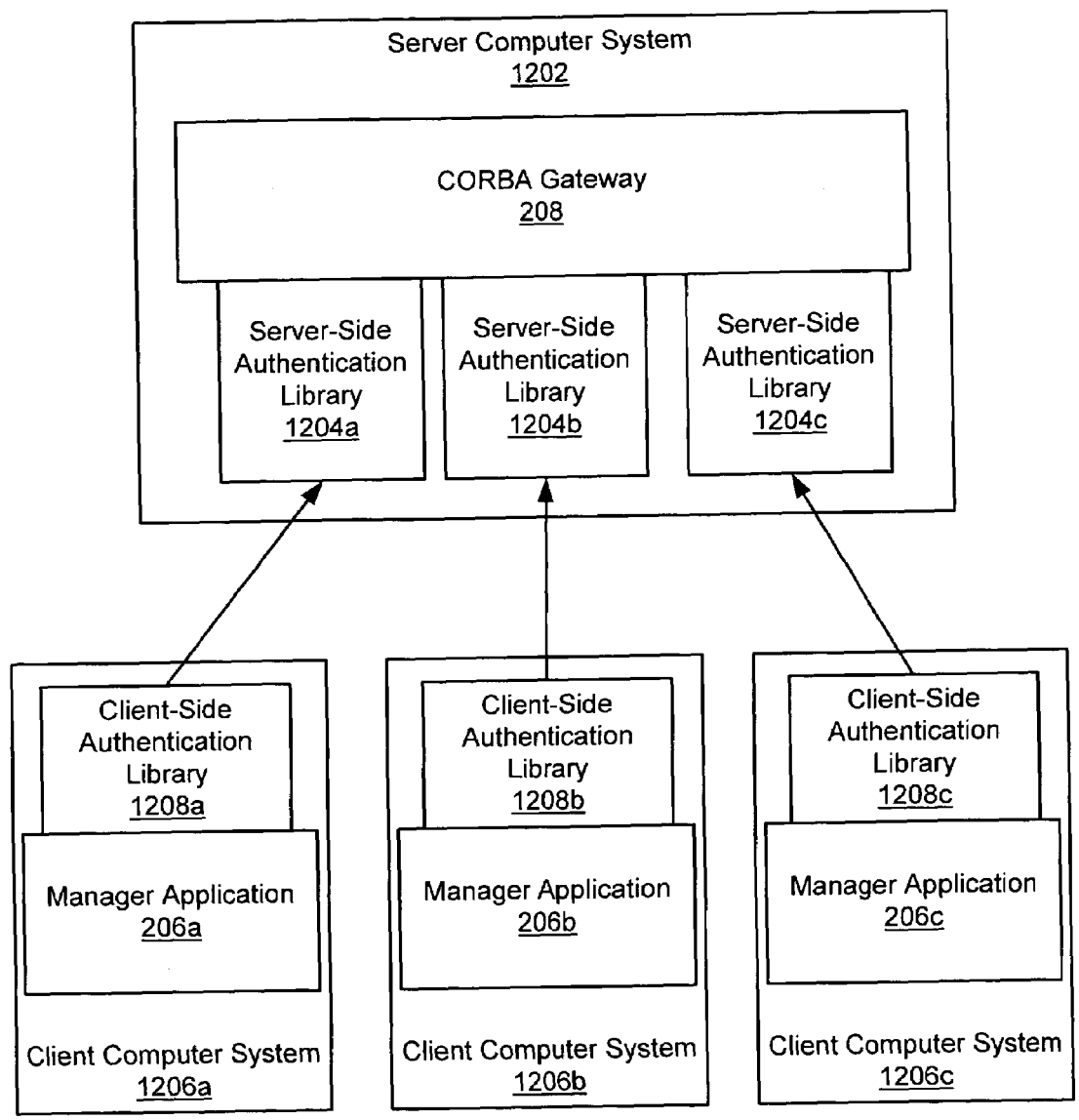
FIG. 13 illustrates an authentication system using pluggable authentication modules according to one embodiment.

FIG. 13: Pluggable Authentication Modules

FIG. 13 illustrates an authentication system using pluggable authentication modules according to one embodiment. As can be seen in FIG. 13, a CORBA gateway 208 resides on a server computer system 1202. Also installed on the server computer system 1202 are several server-side authentication libraries 1204. Corresponding to each of these server-side libraries 1204, are several client computer systems 1206. Each client computer system 1206 has installed on it a manager application 206 and a client-side authentication library 1208. Note that although three clients and authentication modules are shown, this is only for illustrative purposes; in various embodiments, the number of clients and modules may be more or less. In one embodiment, each client provides the implementation of both library components of the corresponding authentication module. Because each module follows the same specification, i.e., has the same interface, the manager applications 206 and the CORBA gateway 208 handle the authentication process for each user in the same way.

Figure 14:
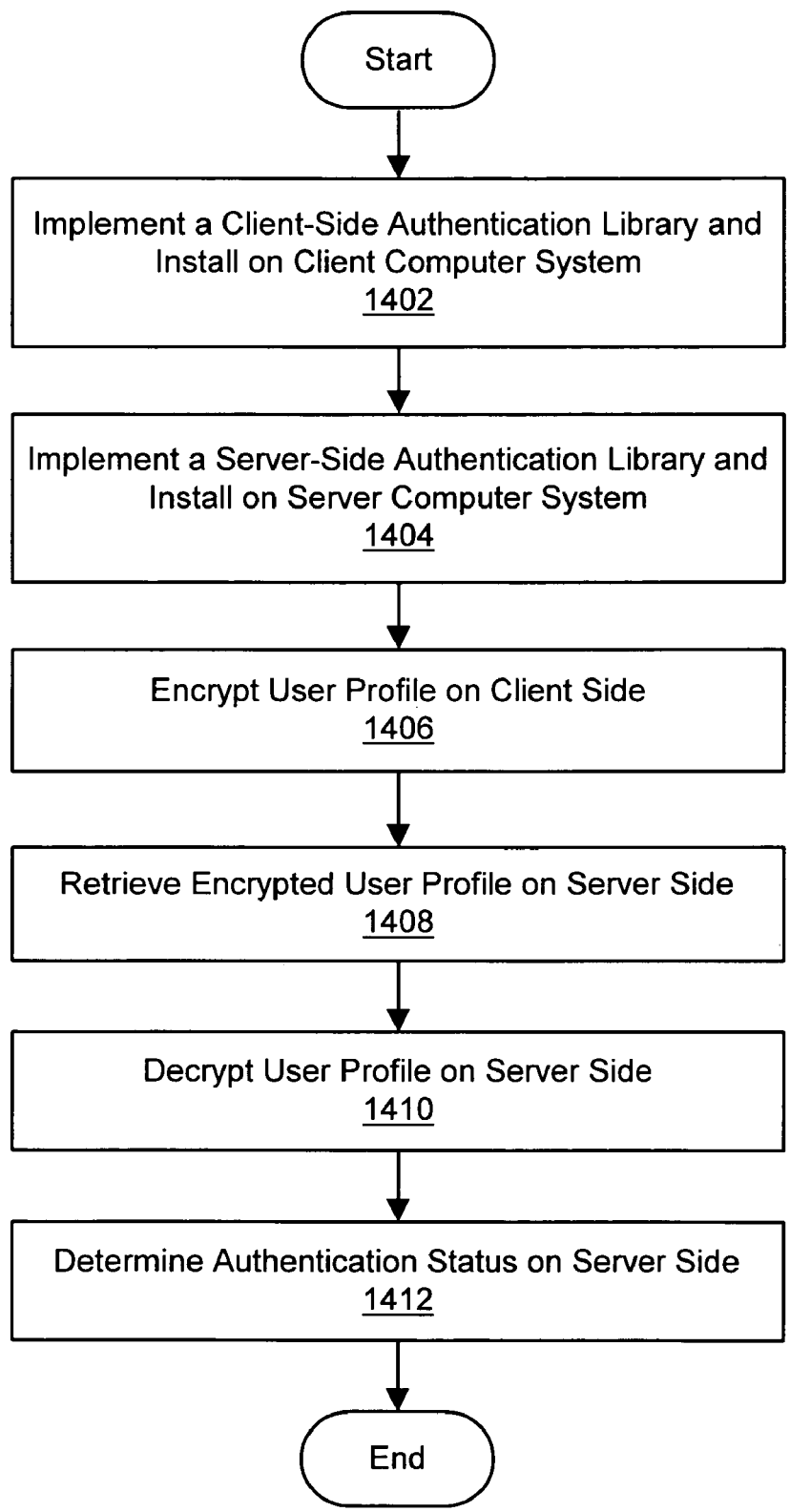
FIG. 14 illustrates an authentication process according to one embodiment.

FIG. 14: Authentication Process

FIG. 14 illustrates an authentication process according to one embodiment. As shown in FIG. 14, a client-side authentication library is implemented and installed on a client computer system, indicated by 1402. As discussed above, the client-side authentication library is implemented in accordance with a platform-independent (e.g., IDL) interface. In 1404, a server-side authentication library is implemented and installed on a server computer system. As discussed above, the server-side authentication library is implemented in accordance with a platform-independent (e.g., IDL) interface. The client-side and server-side authentication libraries may use any suitable authentication scheme.

As 1406 indicates, a user profile may be encrypted by the client-side authentication library, as specified by the client-specified and implemented encryption scheme. Then, as indicated by 1408, the server-side authentication library retrieves the encrypted user profile. At 1410 the server-side authentication library then decrypts the user profile. With the resulting information, the authentication status of the user may be determined, as indicated in 1412. In one embodiment, this process may be used to authenticate management requests for managed objects sent by manager applications.

The fact that the authentication system may be implemented as pluggable modules makes the system extremely flexible and extensible. In one embodiment, default versions of the client-side authentication library and the server-side authentication library may be provided so that the client user need not implement his own authentication scheme unless he specifically wishes to do so.

Figure 15:
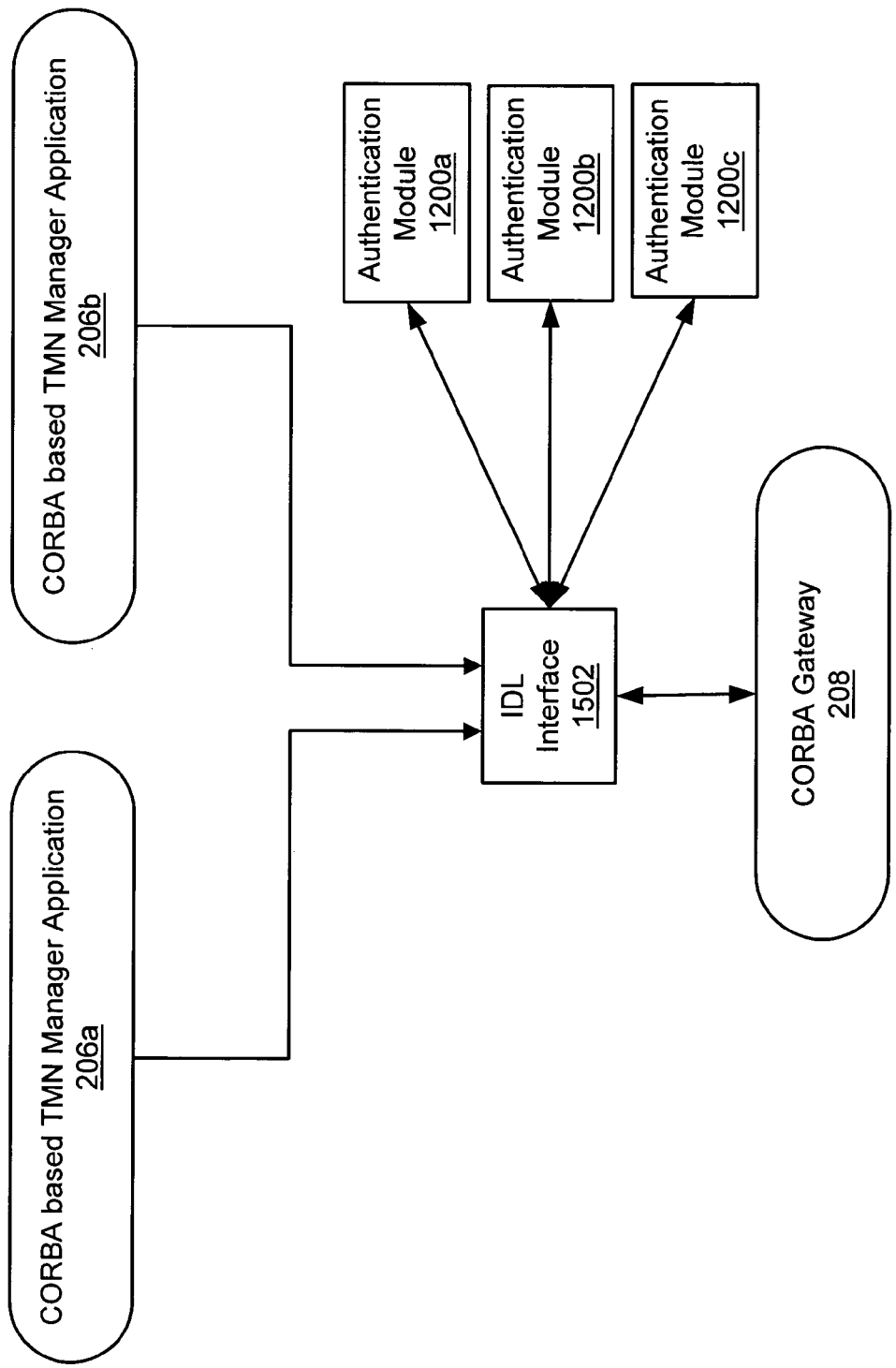
FIG. 15 illustrates a CORBA gateway with pluggable authentication modules, according to one embodiment.

FIG. 15: CORBA Gateway With Pluggable Authentication System

FIG. 15 illustrates a CORBA Gateway with pluggable authentication modules, according to one embodiment. As shown in FIG. 15, a CORBA Gateway 208 may be coupled to one or more pluggable authentication modules 1200 through a platform-independent interface 1502, such as IDL. One or more CORBA-based TMN manager applications 206 may be communicatively coupled to the CORBA Gateway 208. The manager applications 206 may be further coupled to the one or more pluggable authentication modules via the platform-independent interface 1502. The manager applications 206 may be operable to send and receive Interface Definition Language (IDL) messages to and from the CORBA Gateway 208. In various embodiments, the authentication modules 1200 may provide a variety of authentication schemes which may be used to authenticate users of the TMN Manager Applications 206. For example, one authentication module may provide for user profile encryption using the Data Encryption Standard (DES), while another may use the Pretty Good Privacy (PGP) encryption scheme. In this way, a standard platform-independent interface may be used to access a number of authentication methods, providing a simple yet flexible and extensible authentication system. Various embodiments of the CORBA Gateway 208 may include one or more components such as an Event Gateway (as shown in FIG. 3), and a Request Gateway (as shown in FIG. 7), which may use the pluggable authentication modules to provide authentication of users before and during providing gateway services.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 108 and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A network management system, comprising:
   an event gateway which is coupled to one or more managed objects and which is configured to deliver events generated by the one or more managed objects to one or more managers; and
   a platform-independent interface to the event gateway, wherein the event gateway is configurable to communicate with the one or more managers through the platform-independent interface to deliver the events generated by the one or more managed objects;
   wherein the event gateway comprises a plurality of event distribution server sinks configured to receive events generated by the one or more managed objects and distribute the events to the one or more managers such that one of the one or more managers receives events from a plurality of different ones of the event distribution server sinks; and
   wherein the gateway is configurable to provide the one or more managers with subscriptions to the events as a function of event criteria specified by the one or more managers, wherein events meeting the specified event criteria are delivered and events failing to meet the specified event criteria are filtered out.

2. The network management system of claim 1, wherein the event criteria comprise an object class for the one or more managed objects generating the events.

3. The network management system of claim 1, wherein the event criteria comprise an object instance for one of the one or more managed objects generating the events.

4. The network management system of claim 1, wherein the event criteria comprise an event type.

5. The network management system of claim 1, wherein the platform-independent interface to the event gateway is expressed in an interface definition language, and wherein the interface definition language comprises a language for defining interfaces to one or more managed objects across a plurality of platforms and across a plurality of programming languages.

6. The network management system of claim 5, wherein the interface definition language comprises Object Management Group Interface Definition Language (OMG IDL) interface.

7. The network management system of claim 1, wherein the one or more managed objects comprise one or more objects corresponding to a telephone network.

8. The network management system of claim 1, wherein the one or more managed objects comprise an object corresponding to a telecommunications device.

9. The network management system of claim 1, wherein the event gateway comprises:
an event distribution server, wherein the event distribution server is configurable to listen for the events generated by the one or more managed objects and deliver the events to the one or more managers, wherein the event distribution server comprises the plurality of event distribution server sinks.

10. The network management system of claim 9, wherein the event gateway further comprises:
an event port registry server comprising a plurality of event ports and an event port registry,
wherein the event port registry server is coupled to the event distribution server,
wherein the event ports comprise communication channels for the delivery of the events to the one or more managers, and
wherein the event port registry provides information to the event distribution server regarding which ports correspond to which managers.

11. The network management system of claim 9, wherein the event distribution server comprises:
an event distribution server source which listens for the events from the one or more managed objects; and
wherein the plurality of event distribution server sinks are operable to dispatch the events to the one or more managers as a function of the subscriptions.

12. The network management system of claim 11, wherein the event distribution server sinks are distributed to provide load balancing of the events to the one or more managers.

13. The network management system of claim 1, wherein the events are delivered through the platform-independent interface according to Internet Inter-Object Protocol (IIOP).

14. A network management method comprising:
registering a subscription of a manager application to one or more events generated by one or more managed objects by specifying event criteria to an event gateway, and wherein the event gateway is configurable to communicate with the manager application through a platform-independent interface;
generating a plurality of events including one or more events matching the specified event criteria;
determining whether the specified event criteria are met for each of the plurality of generated events; and
delivering each event for which the specified event criteria are met, wherein events for which the specified event criteria are met are delivered from a plurality of different event distribution server sinks of the event gateway to the manager application.

15. The network management method of claim 14, wherein the event criteria comprise an object class for the one or more managed objects generating the events.

16. The network management method of claim 14, wherein the event criteria comprise an object instance for one of the one or more managed objects generating the events.

17. The network management method of claim 14, wherein the event criteria comprise an event type.

18. The network management method of claim 14, wherein the platform-independent interface to the event gateway is expressed in an interface definition language, and wherein the interface definition language comprises a language for defining interfaces to managed objects across a plurality of platforms and across a plurality of programming languages.

19. The network management method of claim 18, wherein the interface definition language comprises Object Management Group Interface Definition Language (OMG IDL).

20. The network management method of claim 14, wherein the one or more managed objects comprise one or more objects corresponding to a telephone network.

21. The network management method of claim 14, wherein the one or more managed objects comprise an object corresponding to a telecommunications device.

22. The network management method of claim 14, wherein the event gateway comprises:
an event distribution server which is coupled to the event port registry server, wherein the event distribution server is configurable to listen for the events generated by the one or more managed objects and deliver the events to the one or more managers, wherein the event distribution server comprises the plurality of event distribution server sinks.

23. The network management method of claim 22, wherein the event gateway further comprises:
an event port registry server comprising a plurality of event ports and an event port registry;
wherein the event port registry server is coupled to the event distribution server,
wherein the event ports comprise communication channels for the delivery of the events to the one or more managers, and
wherein the event port registry provides information to the event distribution server regarding which ports correspond to which managers.

24. The network management method of claim 22, wherein the event distribution server comprises:
an event distribution server source which listens for the events from one or more managed objects; and
wherein the plurality of event distribution server sinks are operable to dispatch the events to the one or more managers as a function of the subscriptions.

25. The network management method of claim 24, wherein the event distribution server sinks are distributed to provide load balancing of the events to the one or more managers.

26. The network management method of claim 14, wherein the events are delivered through the platform-independent interface according to Internet Inter-Object Protocol (IIOP).

27. A tangible, computer accessible medium, comprising program instructions for network management, wherein the program instructions are computer-executable to perform:

registering a subscription of a manager application to one or more events generated by one or more managed objects by specifying event criteria to an event gateway, and wherein the event gateway is configurable to communicate with the manager application through a platform-independent interface;

generating a plurality of events including one or more events matching the specified event criteria;

determining whether the specified event criteria are met for each of the plurality of generated events; and delivering each event for which the specified event criteria are met, wherein events for which the specified event criteria are met are delivered from a plurality of different event distribution server sinks of the event gateway to the manager application.

28. The tangible, computer accessible medium of claim 27, wherein the event criteria comprise an object class for the one or more managed objects generating the events.

29. The tangible, computer accessible medium of claim 27, wherein the event criteria comprise an object instance for one of the one or more managed objects generating the events.

30. The tangible, computer accessible medium of claim 27, wherein the event criteria comprise an event type.

31. The tangible, computer accessible medium of claim 27, wherein the platform-independent interface to the event gateway is expressed in an interface definition language, and wherein the interface definition language comprises a language for defining interfaces to managed objects across a plurality of platforms and across a plurality of programming languages.

32. The tangible, computer accessible medium of claim 31, wherein the interface definition language comprises Object Management Group Interface Definition Language (OMG IDL).

33. The tangible, computer accessible medium of claim 27, wherein the one or more managed objects comprise one or more objects corresponding to a telephone network.

34. The tangible, computer accessible medium of claim 27, wherein the one or more managed objects comprise an object corresponding to a telecommunications device.

35. The tangible, computer accessible medium of claim 27, wherein the event gateway comprises:

an event distribution server which is coupled to the event port registry server, wherein the event distribution server is configurable to listen for the events generated by the one or more managed objects and deliver the events to the one or more managers, wherein the event distribution server comprises the plurality of event distribution server sinks.

36. The tangible, computer accessible medium of claim 35, wherein the event gateway further comprises:

an event port registry server comprising a plurality of event ports and an event port registry;

wherein the event port registry server is coupled to the event distribution server, wherein the event ports comprise communication channels for the delivery of the events to the one or more managers, and wherein the event port registry provides information to the event distribution server regarding which ports correspond to which managers.

37. The tangible, computer accessible medium of claim 35, wherein the event distribution server comprises:

an event distribution server source which listens for the events from one or more managed objects; and wherein the plurality of event distribution server sinks are operable to dispatch the events to the one or more managers as a function of the subscriptions.

38. The tangible, computer accessible medium of claim 37, wherein the event distribution server sinks are distributed to provide load balancing of the events to the one or more managers.

39. The tangible, computer accessible medium of claim 27, wherein the events are delivered through the platform-independent interface according to Internet Inter-Object Protocol (IIOP).

* * * * *